(12) United States Patent
Stefik et al.

(10) Patent No.: US 10,417,912 B2
(45) Date of Patent: *Sep. 17, 2019

(54) SYSTEM AND METHOD FOR PROVIDING DISTRIBUTED ON-STREET VALET PARKING WITH THE AID OF A DIGITAL COMPUTER

(71) Applicants: Palo Alto Research Center Incorporated, Palo Alto, CA (US); Xerox Corporation, Norwalk, CT (US)

(72) Inventors: Mark Jeffrey Stefik, Portola Valley, CA (US); Alan G. Bell, Los Altos, CA (US); Craig Eldershaw, Belmont, CA (US); Lance E. Good, Gaithersburg, MD (US); Daniel H. Greene, Sunnyvale, CA (US); Francisco Eduardo Torres, San Jose, CA (US); Serdar Uckun, Palo Alto, CA (US); David Preston Cummins, Washington, DC (US); Kurt Partridge, San Francisco, CA (US)

(73) Assignee: Conduent Business Services, LLC, Florham Park, NJ (US)

(*) Notice: Subject to any disclaimer, the term of this patent is extended or adjusted under 35 U.S.C. 154(b) by 729 days.

This patent is subject to a terminal disclaimer.

(21) Appl. No.: 14/936,564

(22) Filed: Nov. 9, 2015

(65) Prior Publication Data
US 2016/0063863 A1 Mar. 3, 2016

Related U.S. Application Data

(63) Continuation of application No. 14/094,669, filed on Dec. 2, 2013, now Pat. No. 9,183,734, which is a
(Continued)

(51) Int. Cl.
G07B 15/00 (2011.01)
G08G 1/14 (2006.01)
(Continued)

(52) U.S. Cl.
CPC ............. *G08G 1/142* (2013.01); *G06Q 10/00* (2013.01); *G06Q 10/02* (2013.01); *G06Q 50/265* (2013.01);
(Continued)

(58) Field of Classification Search
CPC .......... G08G 1/14; G08G 1/148; G08G 1/142; G06Q 10/02; G06Q 10/00; G07F 17/246
See application file for complete search history.

(56) References Cited

U.S. PATENT DOCUMENTS 3,349,368 A 10/1967 Kates
4,137,662 A 2/1979 Baumer
(Continued)

FOREIGN PATENT DOCUMENTS

CH 703468 1/2012
JP 04335697 11/1992
(Continued)

OTHER PUBLICATIONS

Weinberger et al., US Parking Policies: An Overview of Management Strategies, Institute for Transportation & Development Policy, http://www.streetsblog.org/wp-content/pdf/ITDP_Parking_FullReport.pdf, Feb. 2010, retrieved Jun. 7, 2013.
(Continued)

Primary Examiner — Brian M Epstein
(74) Attorney, Agent, or Firm — Krista A. Wittman

(57) ABSTRACT

A computer-implemented system and method for providing multi-locational curbside valet parking service is provided. A multiplicity of motor vehicle parking spaces are managed by a server. A plurality of smart parking devices and vehicle
(Continued)

occupancy sensors are interfaced with the server. Use of a plurality of the parking spaces is reserved for a valet service. A reservation request for the use of the plurality of the parking spaces is accepted for use by the valet service for a period of time. Occupancy of the reserved parking spaces by a motor vehicle is sensed through the vehicle occupancy sensor. A valet drop-off location of at least one of the parking spaces that is reserved for the use of the valet service and is not occupied by a motor vehicle is identified. The valet drop-off location and a location of a lock box are provided to the motorist through a user interface.

20 Claims, 27 Drawing Sheets

Related U.S. Application Data continuation of application No. 13/182,420, filed on Jul. 13, 2011, now Pat. No. 8,600,786.

(60) Provisional application No. 61/393,337, filed on Oct. 14, 2010.

(51) Int. Cl.

| | |
|---|---|
| *G06Q 10/02* | (2012.01) |
| *G07F 17/00* | (2006.01) |
| *G07F 17/24* | (2006.01) |
| *G07B 15/02* | (2011.01) |
| *G06Q 50/30* | (2012.01) |
| *G06Q 10/00* | (2012.01) |
| *G06Q 50/26* | (2012.01) |
| *G08B 25/12* | (2006.01) |
| *H04N 7/18* | (2006.01) |

(52) U.S. Cl.
CPC ............ *G06Q 50/30* (2013.01); *G07B 15/00* (2013.01); *G07B 15/02* (2013.01); *G07F 17/0021* (2013.01); *G07F 17/246* (2013.01); *G08B 25/12* (2013.01); *G08G 1/14* (2013.01); *G08G 1/147* (2013.01); *G08G 1/148* (2013.01); *H04N 7/18* (2013.01); *G06Q 10/025* (2013.01)

(56) References Cited

U.S. PATENT DOCUMENTS

| | | | |
|---|---|---|---|
| 4,310,890 A | 1/1982 | Trehn et al. | |
| 4,356,903 A | 11/1982 | Lemelson et al. | |
| 4,532,418 A | 7/1985 | Meese et al. | |
| 5,266,947 A | 11/1993 | Fujiwara et al. | |
| 5,432,508 A | 7/1995 | Jackson | |
| 5,432,509 A | 7/1995 | Jackson | |
| 5,570,771 A | 11/1996 | Jacobs | |
| 5,710,557 A * | 1/1998 | Schuette | G07B 15/02 235/380 |
| 5,710,743 A | 1/1998 | Dee et al. | |
| 5,740,050 A | 4/1998 | Ward, II | |
| 5,770,845 A | 6/1998 | Hjelmvik | |
| 5,777,951 A | 7/1998 | Mitschele | |
| 5,841,369 A | 11/1998 | Sutton et al. | |
| 5,910,782 A | 6/1999 | Schmitt et al. | |
| 6,078,272 A | 6/2000 | Jacobs et al. | |
| 6,081,205 A | 6/2000 | Williams | |
| 6,081,206 A | 6/2000 | Kielland | |
| 6,102,285 A | 8/2000 | Elias | |
| 6,111,522 A | 8/2000 | Hiltz et al. | |
| 6,188,328 B1 | 2/2001 | Ho | |
| 6,243,028 B1 | 6/2001 | Krygler et al. | |
| 6,243,029 B1 | 6/2001 | Tomer | |
| 6,275,169 B1 | 8/2001 | Krygler et al. | |
| 6,373,401 B2 | 4/2002 | Ho | |
| 6,411,895 B1 | 6/2002 | Lau et al. | |
| 6,434,158 B1 | 8/2002 | Harris | |
| 6,437,692 B1 | 8/2002 | Petite et al. | |
| 6,459,386 B1 | 10/2002 | Jones | |
| 6,493,676 B1 | 12/2002 | Levy | |
| 6,505,774 B1 | 1/2003 | Fulcher et al. | |
| 6,513,711 B1 | 2/2003 | Hjelmvik | |
| 6,519,329 B1 | 2/2003 | Hjelmvik | |
| 6,577,248 B1 | 6/2003 | Hjelmvik | |
| 6,750,786 B1 | 6/2004 | Racunas | |
| 6,791,473 B2 | 9/2004 | Kimbria et al. | |
| RE38,626 E | 10/2004 | Kielland | |
| 6,812,857 B1 | 11/2004 | Kassab et al. | |
| 6,816,085 B1 | 11/2004 | Haynes et al. | |
| 6,823,317 B1 | 11/2004 | Quimet et al. | |
| 6,885,311 B2 | 4/2005 | Howard et al. | |
| 6,927,700 B1 | 8/2005 | Quinn | |
| 6,929,179 B2 | 8/2005 | Fulcher et al. | |
| 6,946,974 B1 | 9/2005 | Racunas, Jr. | |
| 6,889,899 B2 | 10/2005 | Silberberg | |
| 6,970,101 B1 | 11/2005 | Squire et al. | |
| 7,002,487 B1 | 2/2006 | Montgomery, Sr. | |
| 7,014,355 B2 | 3/2006 | Potter, Sr. et al. | |
| 7,019,670 B2 | 3/2006 | Bahar | |
| 7,123,166 B1 | 10/2006 | Haynes et al. | |
| 7,194,417 B1 | 3/2007 | Jones | |
| 7,237,716 B2 | 7/2007 | Silberberg | |
| 7,277,010 B2 | 10/2007 | Joao | |
| RE40,013 E | 1/2008 | Quinn | |
| 7,321,317 B2 | 1/2008 | Nath et al. | |
| 7,382,244 B1 | 6/2008 | Donovan et al. | |
| 7,393,134 B2 | 7/2008 | Mitschele | |
| 7,474,589 B2 | 1/2009 | Showen et al. | |
| 7,579,964 B2 | 8/2009 | Nath et al. | |
| 7,652,593 B1 | 1/2010 | Haynes et al. | |
| 7,667,619 B2 | 2/2010 | Montgomery, Sr. | |
| 7,688,225 B1 | 3/2010 | Haynes et al. | |
| 7,768,426 B2 | 8/2010 | Groft | |
| 7,791,501 B2 | 9/2010 | Ioli | |
| 7,791,503 B2 | 9/2010 | Breed et al. | |
| 7,805,239 B2 | 9/2010 | Kaplan et al. | |
| 7,714,742 B1 | 11/2010 | Noworolski et al. | |
| 7,839,302 B2 | 11/2010 | Staniszewski | |
| 7,840,427 B2 | 11/2010 | O'Sullivan | |
| 7,855,935 B1 | 12/2010 | Lauder et al. | |
| 7,893,847 B2 | 2/2011 | Shanbhag et al. | |
| 7,900,966 B1 | 3/2011 | Stennett | |
| 7,949,464 B2 | 5/2011 | Kaplan et al. | |
| 7,966,215 B1 | 6/2011 | Myers et al. | |
| 7,956,769 B1 | 7/2011 | Pearl | |
| 8,063,797 B1 | 11/2011 | Sonnabend | |
| 8,111,172 B2 | 2/2012 | Morimoto et al. | |
| 8,175,803 B2 | 5/2012 | Caraballo | |
| 8,244,566 B1 | 8/2012 | Coley et al. | |
| 8,466,962 B2 | 6/2013 | Hutchison | |
| 8,600,800 B2 | 12/2013 | Rowe et al. | |
| 8,620,768 B1 | 12/2013 | Lopez et al. | |
| 8,688,509 B2 | 4/2014 | Rowe et al. | |
| 2002/0077953 A1 | 6/2002 | Dutta | |
| 2002/0099574 A1* | 7/2002 | Cahill | G06Q 10/02 705/5 |
| 2002/0161520 A1 | 10/2002 | Dutta | |
| 2003/0055727 A1 | 3/2003 | Walker et al. | |
| 2004/0068433 A1 | 4/2004 | Chatterjee et al. | |
| 2004/0181439 A1 | 9/2004 | Kakuta et al. | |
| 2004/0236615 A1 | 11/2004 | Msndy | |
| 2004/0254840 A1* | 12/2004 | Slemmer | G06Q 10/02 705/22 |
| 2005/0099320 A1 | 5/2005 | Nath et al. | |
| 2005/0177432 A1* | 8/2005 | Nevergole | G06Q 20/20 705/16 |
| 2005/0182671 A1 | 8/2005 | Hideo | |
| 2005/0229451 A1 | 10/2005 | Mullens | |
| 2005/0270178 A1 | 12/2005 | Ioli | |
| 2005/0280555 A1* | 12/2005 | Warner, IV | G08G 1/14 340/932.2 |
| 2006/0068704 A1 | 3/2006 | Bhakta et al. | |
| 2006/0092002 A1 | 5/2006 | Finkelstein | |

(56) References Cited

U.S. PATENT DOCUMENTS

| | | |
|---|---|---|
| 2006/0152349 A1 | 7/2006 | Ratnakar |
| 2006/0170566 A1* | 8/2006 | Slemmer ............... G08G 1/14 340/932.2 |
| 2006/0227010 A1 | 10/2006 | Berstis |
| 2006/0247848 A1 | 11/2006 | Cheng |
| 2006/0250278 A1* | 11/2006 | Tillotson ............... G08G 1/14 340/932.2 |
| 2006/0259353 A1 | 11/2006 | Gutmann |
| 2007/0008181 A1 | 1/2007 | Rollert et al. |
| 2007/0037554 A1 | 2/2007 | Freeny, Jr. |
| 2007/0040701 A1* | 2/2007 | Browne ............... G08G 1/14 340/932.2 |
| 2007/0050240 A1 | 3/2007 | Belani et al. |
| 2007/0083424 A1 | 4/2007 | Lang |
| 2007/0129974 A1 | 6/2007 | Chen et al. |
| 2007/0136128 A1 | 6/2007 | Janacek et al. |
| 2007/0290888 A1 | 12/2007 | Rief et al. |
| 2008/0033769 A1* | 2/2008 | Koorapati ............ G06Q 10/02 705/5 |
| 2008/0065439 A1 | 3/2008 | Daren |
| 2008/0133425 A1 | 6/2008 | Grush |
| 2008/0136674 A1 | 6/2008 | Jang et al. |
| 2008/0208680 A1 | 8/2008 | Cho |
| 2008/0209781 A1 | 9/2008 | Mortensen |
| 2008/0297599 A1 | 12/2008 | Donovan |
| 2009/0125341 A1 | 5/2009 | Somoza et al. |
| 2009/0164635 A1 | 6/2009 | Denker et al. |
| 2009/0171567 A1 | 7/2009 | Morimoto et al. |
| 2009/0276236 A1 | 11/2009 | Adamczyk et al. |
| 2009/0309760 A1 | 12/2009 | Chew |
| 2010/0017118 A1 | 1/2010 | Dougherty |
| 2010/0030708 A1 | 2/2010 | Ward, II |
| 2010/0106514 A1 | 4/2010 | Cox |
| 2010/0128931 A1 | 5/2010 | Bongard |
| 2010/0190510 A1 | 7/2010 | Maranhas et al. |
| 2010/0198423 A1 | 8/2010 | Hirst |
| 2010/0274656 A1 | 10/2010 | Genshel |
| 2010/0328104 A1 | 12/2010 | Groft |
| 2011/0035261 A1 | 2/2011 | Handler |
| 2011/0060629 A1 | 3/2011 | Yoder |
| 2011/0068739 A1* | 3/2011 | Smith ............... B60L 11/1844 320/109 |
| 2011/0093352 A1 | 4/2011 | Sarmiento et al. |
| 2011/0109276 A1 | 5/2011 | Bohme |
| 2011/0127944 A1 | 6/2011 | Saito et al. |
| 2011/0131083 A1 | 6/2011 | Redmann et al. |
| 2011/0140658 A1 | 6/2011 | Outwater et al. |
| 2011/0166897 A1 | 7/2011 | Beckman |
| 2011/0181441 A1 | 7/2011 | Ma et al. |
| 2011/0193522 A1 | 8/2011 | Uesugi |
| 2011/0199238 A1 | 8/2011 | John |
| 2011/0227533 A1 | 9/2011 | Wolfien |
| 2011/0241619 A1 | 10/2011 | Young et al. |
| 2011/0246252 A1 | 10/2011 | Uesugi |
| 2011/0257881 A1 | 10/2011 | Chen et al. |
| 2012/0053998 A1 | 1/2012 | Redmann |
| 2012/0044091 A1 | 2/2012 | Kim et al. |
| 2012/0062394 A1 | 3/2012 | Pampus et al. |
| 2012/0072311 A1 | 3/2012 | Khan |
| 2012/0078686 A1 | 3/2012 | Bashani |
| 2012/0112698 A1 | 5/2012 | Yoshimura et al. |
| 2012/0173292 A1 | 7/2012 | Solomon et al. |
| 2012/0188101 A1 | 7/2012 | Ganot |
| 2012/0200430 A1 | 8/2012 | Spahl |
| 2012/0203600 A1 | 8/2012 | Fiorucci et al. |
| 2012/0245981 A1 | 9/2012 | Volz |
| 2012/0323643 A1 | 12/2012 | Volz |
| 2012/0326893 A1 | 12/2012 | Glezerman |
| 2013/0009599 A1 | 1/2013 | Yukizane et al. |
| 2013/0073350 A1* | 3/2013 | Blustein ............... G08G 1/14 705/13 |
| 2013/0076296 A1 | 3/2013 | Ushiroda |
| 2013/0144660 A1 | 6/2013 | Martin |
| 2013/0166530 A1 | 6/2013 | Pilat et al. |

FOREIGN PATENT DOCUMENTS

| | | |
|---|---|---|
| JP | 08022598 | 1/1996 |
| WO | 200046068 | 8/2000 |
| WO | 2004084145 | 9/2004 |
| WO | 2006086831 | 8/2006 |
| WO | 2009154599 | 12/2009 |
| WO | 2011002583 | 6/2011 |

OTHER PUBLICATIONS

Geroliminis et al., "A review of green logistics schemes used in cities around the world", UC Berkeley Center of Future Urban transport: A volvo center of excellence, http://escholarship.org/uc/item/4x89p485.pdf, Aug. 1, 2005, retrieved Jun. 19, 2013.

Smith et al., "Intelligent Transportation Systems And Truck Parking," Feb. 2005.

Trefonas. Elisabeth M.W. (2004) "California's Regulation of Non-Consensual Private Property Tows: Why Section 22658(I) is Federally Preempted," California Western Law Review: vol. 41: No. 1, Article 7. http://scholarlycommons.law.cwsl.edu/cwlr/vol41/ss1/7.

Tim O'Donnel, "Resolution Implementing a Street Sweeping Parking Resstriction Enforcement Program," City if Brea, http://righttopark.com/Document/SSR%20-20July%207%202009.pdf, dated Aug. 1, 2018 (year:2009).

Brea City Council, "Right to Park: Brea, CA," http://righttopark.com/council.html, Sep. 7, 2010 update, retrieved Aug. 1, 2018 (Year:2010).

* cited by examiner

SYSTEM AND METHOD FOR PROVIDING DISTRIBUTED ON-STREET VALET PARKING WITH THE AID OF A DIGITAL COMPUTER

CROSS-REFERENCE TO RELATED APPLICATION

This U.S. Patent Application is a continuation of U.S. Pat. No. 9,183,734, issued Nov. 10, 2015, which is a continuation of U.S. Pat. No. 8,600,786, issued Dec. 3, 2013, which claims priority to U.S. Provisional Patent Application, Ser. No. 61/393,337, filed Oct. 14, 2010, the disclosures of which are incorporated by reference.

FIELD

This application relates in general to valet parking and, in particular, to a system and method for providing distributed on-street valet parking with the aid of a digital computer.

BACKGROUND

Public roads primarily facilitate motor vehicle traffic. Vehicle parking is ordinarily offered as a secondary benefit incident to vehicle throughway. Consequently, parking is an inherently limited public resource. Within an urban environment, local government generally regulates parking at curbside, on public roads, in municipal parking lots, and on other public property through a regulatory scheme that both provides revenue generation and promotes public safety and health. Commonly, public parking is regulated through a scheme of fees assessed through parking meters for fixed time period parking, by issuance of permits for residential, commercial, or special use parking, and through zoning that regulates permissible uses of property, including parking on privately-owned property is often offered through hourly fees or some form of parking contract.

Meeting the parking needs of motorists requires more than simply finding a balance between supply and demand, yet the capability to efficiently allocate and manage on-street parking remains elusive, even when parking needs are significant, recurring, and known ahead of time. For instance, urban parking spaces characteristically undergo periods of widely skewed demand and utilization, with low demand and light use in some periods, often during the night, and heavy demand and use at other times. As well, merely finding available parking is only the start, as subsequent occupancy of a parking space must also be permissible under applicable rules. Parking regulations, though, are often complex and confusing, with time limits on parking in residential and business zones, parking enforcement undertaken during working hours in neighborhood zones, parking enforcement of loading zone rules and rules governing parking near fire hydrants occurring at all hours, and exceptions to parking regulations made to accommodate select holidays, depending upon the municipality.

Consequently, the impact of regulated control over on-street parking affects all motorists, as well as urban residents, local businesses, and other parties that use or rely upon on-street parking, such as businesses that offer valet parking services to their customers. Drivers seeking a place to park their motor vehicles are most immediately impacted by regulated parking control. Looking for a parking space wastes time, contributes to traffic congestion, creates frustration, and generates pollution, while violating parking rules, such as by allowing a parking meter to expire, can result in parking tickets, fines, or towing. Motorists therefore need ways to more conveniently and efficiently determine on-street parking availability and ensure parking regulation compliance once parked.

Valet parking services offer motorists with an alternative to finding parking themselves, which can be particularly helpful in an urban environment. A parking valet is responsible for finding a parking space for a customer's car and often also for retrieving the car upon the customer's return. Typically, valet parking might be provided for a special event, such as a black tie gala, or on a recurring basis by a local business, such as a restaurant, bar, or retail store. Businesses sometimes employ their own valets or contract with a valet parking service. The valets park their customers' vehicles from a drop-off location that is generally located convenient to the business's entrance, which the customer is expected to patronize. Although the customers avoid the hassles of self-parking, valets still face the same problems of locating available on-street parking if reserved parking spaces for valet parking only are unavailable, especially where parking lots are scarce. Thus, many valet services only operate in the evening or during off-peak times to increase parking opportunities for their valets. Conventional valet parking services solutions focus on vehicle location and retrieval and fail to adequately alleviate fundamental concerns by valets over finding suitable parking for their customers' cars, particularly in urban settings.

For instance, U.S. Pat. No. 5,710,557, issued Jan. 20, 1998, to Schuette, discloses a computerized valet parking system. A vehicle tracking system has accounting and operational data gathering functions. A first data transceiver inputs and retrieves a first set of vehicle identification data, and a second data transceiver located at a remote vehicle parking facility inputs and retrieves a second set of vehicle identification data. The first and second sets of vehicle identification data are stored by a central processor and the second data transceiver outputs vehicle pickup data for retrieval purposes in response to a vehicle retrieval command from the central processor, thereby allowing a customer to remain within a building until his vehicle has been retrieved.

U.S. Patent Application Publication No. 2010/0106514, published Apr. 29, 2010, to Cox, discloses travel-related services provided via a satellite digital audio radio system (SDARS). In one embodiment, information on parking garages near a certain location and their available parking spaces is provided as a parking data service to users of SDARS. A parking service may be provided to devices that incorporate a navigation system or as a companion to a traffic data service. The parking service can involve a variety of components, including a parking server, a parking console, a parking protocol, a parking user interface, and parking provisioning. The parking service may provide any suitable information about the parking garages in a garage map or a garage list, such as garage services, including whether valet parking is available.

U.S. Pat. No. 7,805,239, issued Sep. 28, 2010, to Kaplan et al., discloses a method of operating a navigation system to provide parking availability information, including any amenities provided, such as valet parking services. A destination location is obtained and a parking facility proximate the destination location is identified. Historic parking availability information for the parking facility is provided based on past parking availability patterns. A route from an origin to the parking facility may be calculated and guidance for following the route provided through a navigation system.

U.S. Pat. No. 7,893,848, issued Feb. 22, 2011, to Chew, discloses an apparatus and method for locating, identifying, and tracking vehicles in a parking area. The occupancy status of parking spaces is provided by processing images to provide information regarding locations and numbers of empty and occupied spaces, and guidance information to locate each space. Additionally, live parking lot images can be displayed in a digital map to assist users, such as drivers, customer service personnel, valet services attendants, and others, to visually locate and identify a vehicle of interest.

U.S. Pat. No. 7,979,202, issued Jul. 12, 2011, to Adamczyk et al., discloses implementing a vehicle locator service. Location identification information indicates the presence of a vehicle at a parking pace and an occupancy record is created that includes object identification information and location identification information. The parking area may provide value-added services, such valet parking A request to locate a vehicle during an exiting process is received. The location identification information from the occupancy record associated with the object identification information is retrieved and the location identification information of the parking space is presented to the operator. The location identification information is received via a radio frequency identifier associated with the parking space. The parking location may be reserved for preferred customers, such that the automatic identification information provided via the radio frequency identifier includes a unique code that distinguishes the location's occupant from other users.

U.S. patent Application Publication No. 2005/0280555, published Sep. 22, 2005, to Warner, V I, discloses dynamically managing parking, which includes the use of an intelligent software engine that interfaces with a wireless mesh network of multi-channel communication devices. A parking transceiver mesh network node located proximate to one or more parking spaces provides accurate and current data to a database of available parking spaces. Parking availability algorithms are used to analyze this data to select optimal parking spaces for drivers and predict future availability. The databases may include all subscriber information for parking services, including valet services. Conventional parking solutions typically focus on either determining availability of parking spaces for valet parking use, or identifying where valet parking services are provided. Therefore, there is a need for equipping valet parking services with a comprehensive set of services that allow more flexible types of valet parking, instead of simply a convenient alternative to self-parking.

SUMMARY

One embodiment provides a system and method for providing distributed on-street valet parking with the aid of a digital computer. A centrally-located server is configured to interface over a computer network and includes a memory and a computer processor. The computer processor is operatively coupled to the memory and is configured to execute computer execute modules. The server manages a multiplicity of motor vehicle parking spaces disbursed over a plurality of physically-separate and openly-disbursed parking locations. A plurality of smart parking devices that are each located proximate to and which correspond to at least one of the parking spaces are interfaced by the computer processor via the computer network. A plurality of vehicle occupancy sensors that are also each physically located proximate to and which correspond to at least one of the parking spaces are interfaced by the computer processor via the computer network. A plurality of parking availability indicators that are each associated with at least one of the parking spaces are interfaced by the computer processor via the computer network. Each of the parking availability indicators includes a plurality of indications that correspond to an availability of each of the associated parking spaces for parking based upon actual, reserved and restricted use of the parking space as provided to the parking availability indicator by the server and by the smart parking device and the vehicle occupancy sensor that both correspond to each of the parking spaces with which the parking availability indicator is associated. Use of a plurality of the parking spaces for a valet service is reserved by the server. A reservation request for the use of the plurality of the parking spaces that are specified by their locations for use by the valet service for a period of time is accepted by the server. Occupancy of the parking spaces that are reserved for the use of the valet service by a motor vehicle is sensed through the vehicle occupancy sensor that corresponds to each of the parking spaces that are reserved for the use of the valet service, during the time period, and the occupancy is provided to the server via the network. Reserved use only of each of the parking spaces that are reserved for the use of the valet service is indicated by the parking availability indicator that corresponds to each of the parking spaces that are reserved for the use of the valet service, as provided to the corresponding parking availability indicator from the server via the network, throughout the time period based upon the current time and the use of the corresponding parking space by the valet service. A curbside valet is assisted through the server in use of a plurality of the parking spaces that have been reserved for use of the valet service. The location of at least one of the plurality of the parking spaces which is not occupied by a motor vehicle is identified to a device used by the curbside valet that is interfaced with the server via the computer network. The location of the at least one parking space that was identified as reserved and not occupied is provided to the device used by the curbside valet.

A further embodiment provides a system and method for providing distributed on-street valet parking with the aid of a digital computer. A centrally-located server is configured to interface over a computer network and includes a memory and a computer processor. The computer processor is operatively coupled to the memory and is configured to execute computer execute modules. The server manages a multiplicity of motor vehicle parking spaces disbursed over a plurality of physically-separate and openly-disbursed parking locations. A plurality of smart parking devices that are each located proximate to and which correspond to at least one of the parking spaces are interfaced by the computer processor via the computer network. A plurality of vehicle occupancy sensors that are also each physically located proximate to and which correspond to at least one of the parking spaces are interfaced by the computer processor via the computer network. A plurality of parking availability indicators that are each associated with at least one of the parking spaces are interfaced by the computer processor via the computer network. Each of the parking availability indicators includes a plurality of indications that correspond to an availability of each of the associated parking spaces for parking based upon actual, reserved and restricted use of the parking space as provided to the parking availability indicator by the server and by the smart parking device and the vehicle occupancy sensor that both correspond to each of the parking spaces with which the parking availability indicator is associated. Use of a plurality of the parking spaces for a valet service is reserved by the server. A reservation request for the use of the plurality of the parking spaces that are specified by their locations for use by the valet service for a period of time is accepted by the server. Occupancy of the parking spaces that are reserved for the use of the valet service by a motor vehicle is sensed through the vehicle occupancy sensor that corresponds to each of the parking spaces that are reserved for the use of the valet service, during the time period, and the occupancy is provided to the server via the network. Reserved use only of each of the parking spaces that are reserved for the use of the valet service is indicated by the parking availability indicator that corresponds to each of the parking spaces that are reserved for the use of the valet service, as provided to the corresponding parking availability indicator from the server via the network, throughout the time period based upon the current time and the use of the corresponding parking space by the valet service. The valet service is assisted through the server in use of the parking spaces that have been reserved. The location of at least one of the plurality of the parking spaces which is not occupied by a motor vehicle is identified. The location of the at least one parking space that was identified as reserved and not occupied to the valet service is provided to a device used by the valet service that is interfaced with the server via the computer network. Occupancy of the at least one parking space by a motorist's motor vehicle and a time when the motorist is likely to return for a motor vehicle left with the curbside valet with identification information for the motorist are tracked through one of the smart parking devices.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Infrastructure

Figure 1:
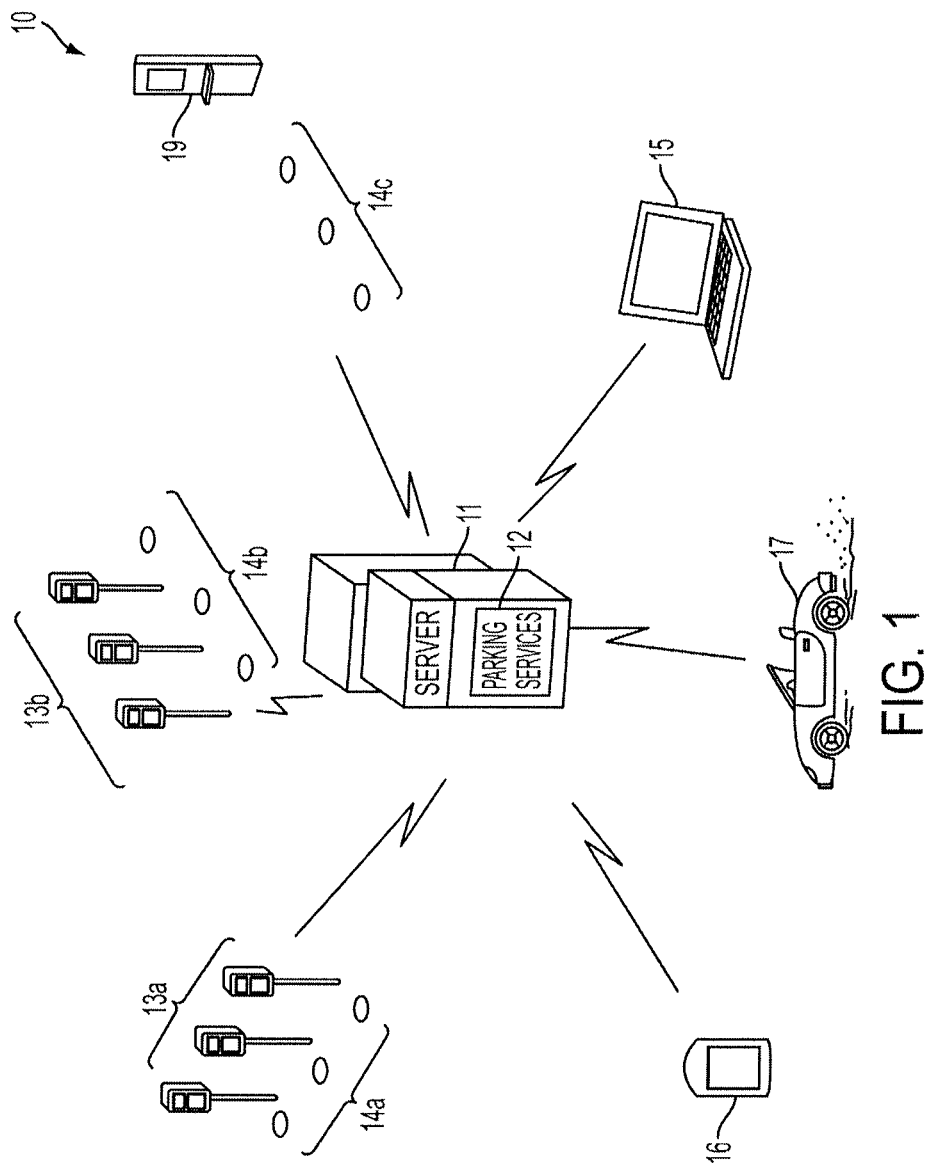
FIG. 1 is a block diagram showing a computer-implemented system for managing on-street valet parking in accordance with one embodiment.

Real-time and account-based parking services through a network of smart parking devices for controlling and managing all manner of motor vehicle parking FIG. 1 is a block diagram showing a computer-implemented system 10 for managing on-street valet parking in accordance with one embodiment. For simplicity, parking, whether controlled by local government or privately owned, and regardless of whether curbside, on a driveway, in cutouts in front of a driveway, within a parking lot, or in other physical locations will henceforth be called "on-street parking" or simply "parking."

A suite of parking services 12 is provided through one or more servers 11, which are located within a network of smart parking devices 13a-c, sensors 14a-c, and parking services kiosks 19. The parking services 12 are account-based and enable motorists and other users to determine the availability of, reserve, and efficiently use parking, as further described below in detail beginning with reference to FIG. 3.

The parking devices 13a-c and parking services kiosks 19 are associated with one or more parking spaces and allow motorists to reserve or transact on-street parking through the parking services server 11. Each parking device 13a-c can include a physical parking availability indicator (not shown), either directly interfaced with the parking device 13a-c or remotely connected through the parking services server 11. Physical parking availability indicators audibly or visually signal parking availability to motorists. In a further embodiment, the parking availability indicators are virtual and are provided electronically to motorists using their mobile devices, including notebook or tablet computers 15, smart telephones 16 and similar personal electronic devices, and on-board navigational or informational devices 17. Finally, each parking space has a sensor 14*a-c* that determines whether a parking space is occupied by a motor vehicle, either directly interfaced with the parking device 13*a-c* or remotely connected through the parking services server 11.

The parking services 12 and associated parking devices 13*a-c* and parking services kiosks 19, as well as mobile devices 15, 16, 17, where applicable, implement network security protocols to ensure secure communications. As necessary different secure communications schemes and levels can be applied over all communications. For example, public key cryptography could be used in various secure protocols to protect communications between all system elements. The specific components will now be discussed in detail.

Multi-Function Smart Parking Devices

Figure 2:
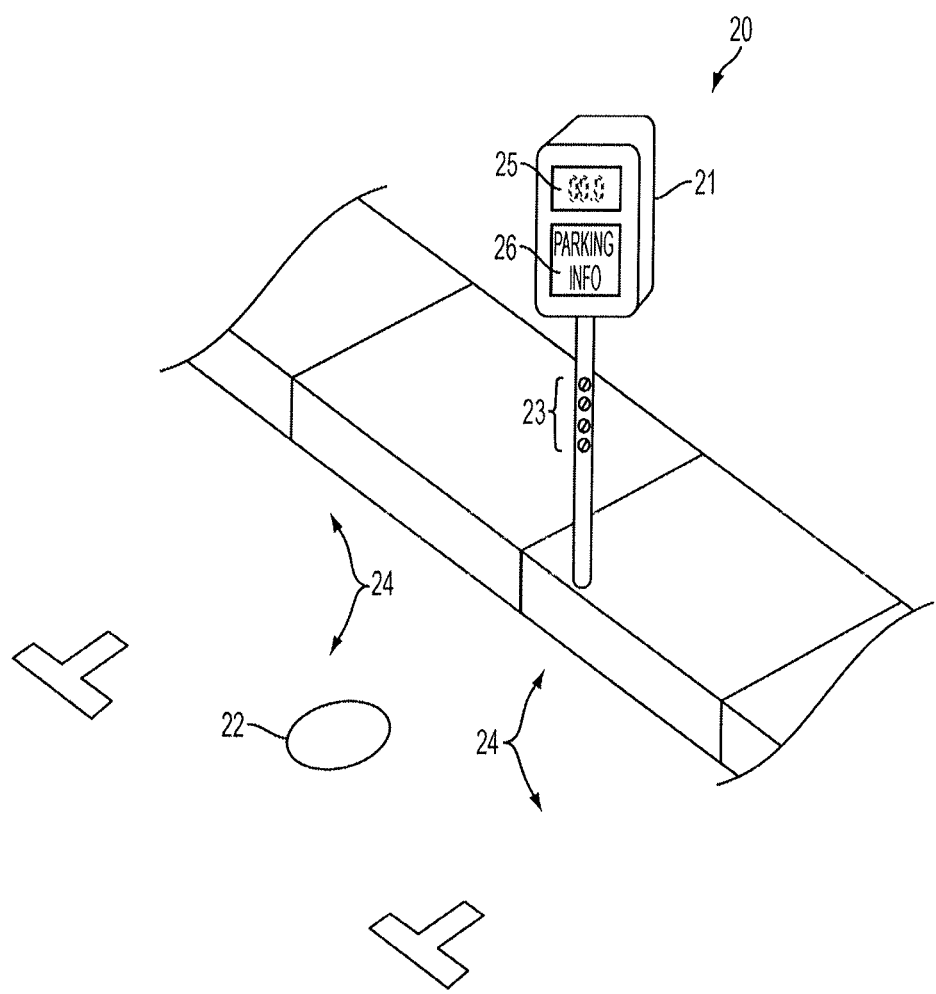
FIG. 2 is an illustration showing, by way of example, a smart parking device with a vehicle sensor and parking indicator for use in the system of FIG. 1.

Smart parking devices are located at or near parking spaces. FIG. 2 is an illustration 20 showing, by way of example, a smart parking device 21 with a vehicle sensor 22 and parking availability indicator 23 for use in the system 10 of FIG. 1. Each parking device 21 is interconnected over a network with the parking services server 11. The parking device 21 can be networked into the parking services 12 through a wired or wireless connection. In the simplest case, each parking device 21 serves a single parking space 24 in a one-to-one relationship. Alternatively, each parking device 21 could serve a plurality of parking spaces 24 in a one-to-many relationship. For instance, at curbside, one parking device 21 could serve two adjacent parking spaces 24. In a parking lot with facing parking spaces, a parking device 21 could serve two pairs of facing parking spaces 24. Finally, several parking devices 21 could serve a multiplicity of parking spaces 24 in a many-to-many relationship; motorists would enter a number painted on the pavement or other identifier that identifies the parking space 24 that they plan to use into one of the parking devices 21.

In a further embodiment, parking services kiosks 19 (shown in FIG. 1) are located nearby to support interactive transactions for one or more parking spaces 24. The kiosks 19 need not be assigned to a specific set of parking spaces and can instead be conveniently distributed to maximize usage within a municipality. A user can simply use any available kiosk 19 to reserve parking, so if a line of waiting users forms at one kiosk 19, the user can move to another available kiosk 19 and avoid further delay. Parking sensor 22 connected to the kiosk could be remotely housed, for instance, in low-profile curbside devices and acoustic and visual feedback could be provided to the driver at the kiosk to interactively transaction parking services. The kiosk could operate through dedicated software, or execute Web-based applications remotely served from the parking services server 11. Other forms of kiosks and kiosk-based functionality are possible.

Each parking space 24 is also equipped with a sensor 22 for determining whether a parking space 24 is occupied by a vehicle. The sensor 22 could be locally connected to a nearby parking device 21 or parking services kiosk 19, or remotely connected to the parking services server 11, which then facilitates communication between the sensor 22 and the nearby parking device 21. The sensor 22 can be networked through a wired or wireless connection. The sensor 22 could be located in a puck or similar robust enclosure fixed onto the surface of the street inside of or proximate to the parking space 24, or could be attached to the street curb. Alternatively, each sensor 22 could be incorporated into a parking device 21 using, for instance, an acoustic- or video-based sensor. Further, like the parking devices 21, the sensors 22 can be configured in a one-to-one, one-to-many, or many-to-many relationship with a set of parking spaces 24. For instance, one video-based sensor 22 could be positioned to simultaneously monitor several parking spaces 24.

Finally, each parking space 24 is equipped with a parking availability indicator 23. The parking indicator 23 could be locally connected to a nearby parking device 21 or remotely connected to the parking services server 11, which then facilitates communication between the parking indicator 23 and the nearby parking device 21. The parking indicator 23 can be networked through a wired or wireless connection. Analogous to traffic lights that indicate when vehicles may enter into intersections, parking indicators 23 indicate when vehicles may use parking spaces 24. Like the parking devices 21 and sensors 22, the parking indicators 23 can be configured in a one-to-one, one-to-many, or many-to-many relationship with a set of parking spaces 24.

Parking indicators 23 can provide physical, typically audible or visual, or digital "virtual" parking availability indications. A physical parking indicator 23 can be in a standalone enclosure or located on a parking device 21 or on a conventional parking meter. Alternatively, a parking indicator can be located in a low-profile enclosure at the curb or on the edge of the curb. A digital parking indicator (not shown) can be broadcast wirelessly to nearby motor vehicles from a parking device 21 or other broadcasting source, such as a wireless transmitter locally connected to a parking device 21 or parking services kiosk 19, or remotely connected to the parking services server 11. A digital parking indicator could also be broadcast over a publically-accessible network, such as the Internet, and delivered to users electronically. For example, portable or mobile devices 15, 16, 17 with global positioning system (GPS) or other location-sensing capabilities could retrieve parking status indicators concerning nearby parking spaces. Finally, in one embodiment, a parking indicator 23 is provided for each parking space 24 and is incorporated into a nearby parking device 21. Alternatively, a parking indicator 23 can be in the form of an automated sign or display for a group of parking spaces 24 with indications signifying which spaces are available.

In a further embodiment, simplified parking indicators (not shown) having a lower physical profile than the parking devices 21, for instance, through mounting in a low-profile housing or vertical pole mounted above the street curb or by integration into or attachment onto the street curb itself, are provided for each parking space 24. Alternatively, the simplified parking indicators can be embedded into the curb or within or along the entire length of a parking space, effectively becoming the curb itself, rather than being attached to or otherwise being affixed as a component separate from the curb proper. Whereas with attached parking indicators, naïve motorists may park indiscriminately in parking spaces that are not available for lack of an awareness as to how the indicators work. With a parking indicator embedded into and serving as the curb itself, motorists already understand the correct meaning of color-coded curbs, as typically mandated by traffic codes and parking ordinances, and, as a result, no specialized education as to parking indicator meaning is necessary. A whole curb parking indicator could be provided, for instance, using a low power large-scale display or similar technology.

The parking indicators 23 tell motorists the status of a parking space 24. The parking indicators 23 can provide a visual status indication, such as through color-coded indicators located on a parking device 21. The indicators can be implemented using incandescent lights, light emitting diodes, reflective surfaces, and similar materials that may only require low power, or be unpowered. Under one color coding scheme, a solid red indicator means that parking space 24 is not available at the moment, a solid yellow indicator means that the parking space 24 is only available for a short time period, such as less than two hours, and a solid green indicator means that the parking space 24 is available for a long time period, such as two hours or longer. Analogous to blue markings for handicapped parking, a solid blue indicator means that a special permit, such as issued to handicapped motorists, is required. In a further embodiment, the color scheme can be extended beyond showing availability to indicating that the time allotted to park has expired, such as by displaying a solid red indicator to the parked motorist. Other color-coded lighted indicators are also possible.

Alternatively, visual labels or icons could be presented in lieu of a static color-coded indicators. For instance, a label or icon could signal to a motorist that the time has expired or that the parking space is reserved. The amount of time available at a parking space 24 could also be shown through a label or icon. Similarly, a visual label or icon could clarify what type of permit is required to park, such as a handicapped parking permit. Other visual labels or icons are also possible.

As well, color-coded lighted indicators could be combined with flashing indicators. A red flashing indicator could be used to indicate a parking violation or expired time. A yellow and blue flashing indicator could be used to signal a reserved loading zone available for a short time period. Finally, a red and blue flashing indicator could be used to indicate a parking space reserved for a guest motorist.

Other colors, color combinations, and arrangements of solid, flashing, graduated, or adjusted lighted indicators could also be utilized as parking indicators. Similarly, indicators other than colors, such as shapes, positions, alphanumeric symbols, or icons, could be used to differentiate states of parking availability. In one embodiment, color and shape combinations similar to conventional traffic signs can be used. For example, to indicate the non-availability of a parking space 24, a plain red octagonal shape or a red octagonal shape labeled with the word "Stop" could be displayed. Alternatively, a circular shape labeled with the word "Park" could be displayed with a diagonal line crossing out the word "Park" to indicate no parking Finally, the color green could be used with a circle, the color yellow with a triangle, and the color blue with a square, as used in some forms of traffic signage.

The parking device 21 can also serve a parking indicator function. In one embodiment, each parking device 21 can also have an indicator or display 25, preferably located at the top of the device to enhance viewing by drivers, showing the time remaining in a parking period. In a further embodiment, each parking device 21 can also include an additional indicator or display 26 for presenting other information, such as public service messages or advertising. When a car is parked in the parking space 24 associated with the parking device 21, the display 25 can the time remaining before parking expires. The display 25 could transition to a red indicator when the time has expired, analogous to conventional parking meters. When the parking space 24 is available, the display 25 could show how much time is left before any applicable time constraint is reached. For instance, another motorist may have separately reserved the parking space 24 through the parking services server 11, but the parking space 24 is otherwise available up through the time of the reservation. As well, parking may become unavailable due to scheduled street cleaning or other event. A color overlay could be provided over the time indication in the display 25 to assist user understanding.

The parking devices 21, whether standalone or configured through a kiosk 19, interface motorists and other users with the parking services server 11. Each parking device 21 and kiosk 19 includes a user interface (not shown) for identifying which parking space 24 is being reserved and determining the user's identification. When booking a reservation, the parking device 21 or kiosk 19 undertakes an abbreviated "Hold this Space" service transaction, described infra, with the user. The particular parking space 24 can be indicated, for example, by displaying the location of the space on a map. The user's identification is indicated using an account number, credit or debit card number, or other unique identifier that can be provided to the parking device 21 or kiosk 19 through a magnetic strip or bar code reader for scanning credit cards, driver's licenses, parking identification cards, or other forms of identification. Alternatively, the parking device 21 or kiosk 19 can accept wireless transmissions, for instance, using Bluetooth, Wi-Fi, or Wi-Max protocols, or wired transmissions of the user's identification from a mobile device 15, 16, 17, such as a smart mobile telephone, notebook or tablet computer, or similar personal electronic device. In a further embodiment, the parking device 21 can include a camera or other input device to visually scan the user's face or read the license plate of a motorist's vehicle, a wireless transponder to retrieve a radio frequency identification (RFID) tag on the motorist's vehicle, or other sensor to identify the requesting user or the vehicle parked.

Parking Services Server

Figure 3:
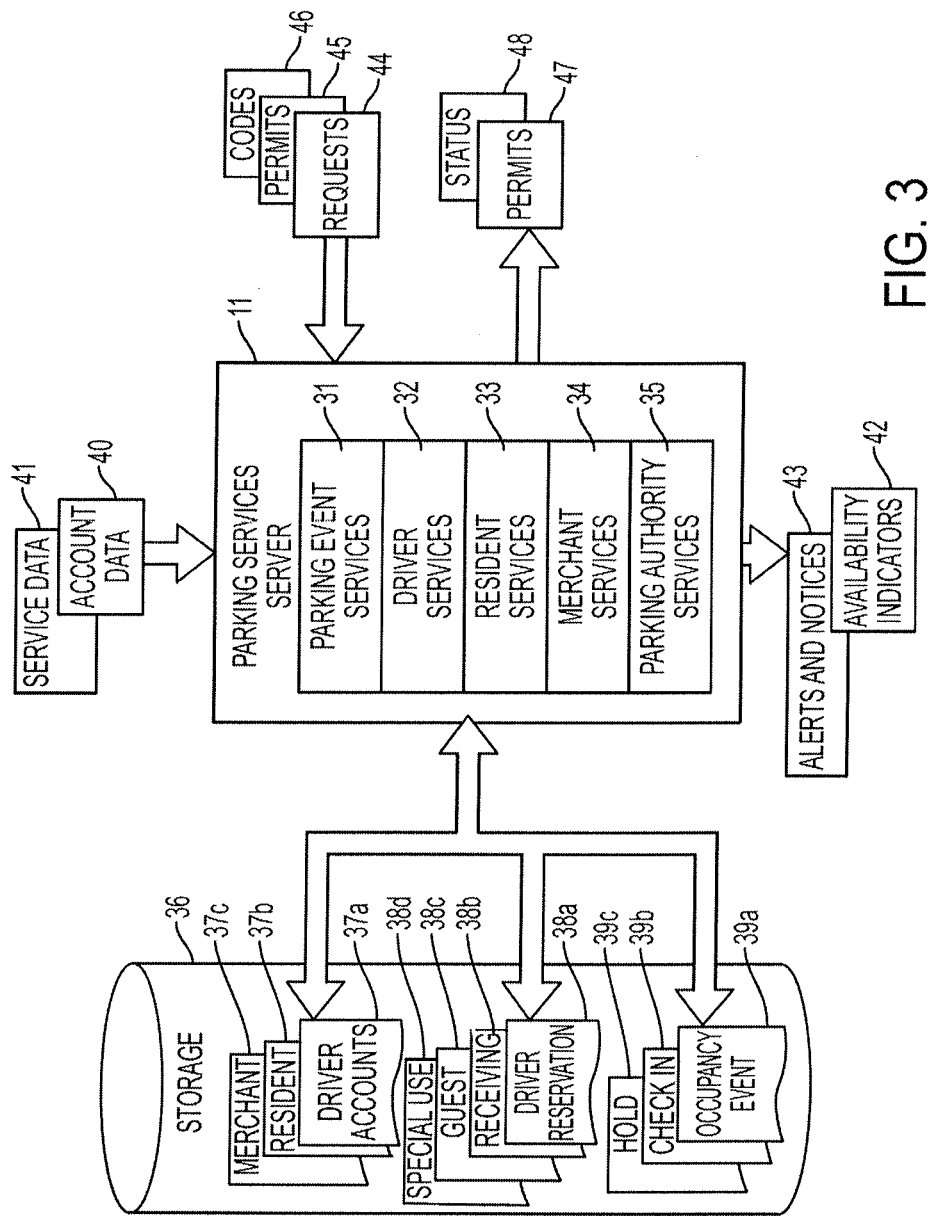
FIG. 3 is a functional block diagram showing the parking services of FIG. 1.

The parking services 12 are account-based. FIG. 3 is a functional block diagram 30 showing the parking services 12 of FIG. 1. The parking service 12 are supported by a set of services (not shown). The parking services 12 and the services are implemented in software and execution of the software is performed as a series of process or method modules or steps.

Both the parking services 12 and the other related support services may be executed on one or more computer systems, which may singly or in combination logically constitute a particular form of "server." For instance, in one embodiment, a Web server delivers Web pages and content to Web-based clients, such as Web browsers executing on mobile devices 15, 16, 17. The Web server can be implemented using more than one computer, depending upon the load.

Similarly, the provisioning of the system functionality is divided between the one or more servers and the various end-user devices with which a motorist directly interfaces, such as parking devices 21, parking services kiosks 19, and mobile devices 15, 16, 17. Programmatic duties are divided between the software that runs in each end-user device and the servers. The division of labor balances several competing goals, which includes a low power requirement for the end-user device, fast user interaction response, and keeping end-user device programming relatively simple.

Additionally, the Web server may be supported by caching servers that cache the Web content and help reduce bandwidth consumption and system load. The caching servers may also be implemented using more than one computer. System state for the parking services 12 is kept in a database server, which keeps track of the state of all of the parking devices 21, parking services kiosks 19, and sensors 24, all of the parking accounts, all of the permits, all of the parking citations, all of the billings, all of the parking policies, and so forth. The database server may be implemented using more than one computer. As well, the suite of services can also be fielded by through cloud computing. Henceforth, for simplicity, the set of services will be discussed without regard to the nature of the implementing servers or the underlying physical topology of the supporting computers, except as specifically noted.

At any given time, several coordinated processes execute across the servers. Depending upon the scale of the system, several computers may need to work together to carry out each of the services. One set of the services is engaged with the collection and verification of requests for new services and changes to existing services. City officials or parking authorities that establish new parking policies present a special case of the services. For example, they may need to initiate a new parking regulation, which applies over certain hours on certain days. The rules and parameters for the service could be expressed through a description language for permits, regulations, and the like, with parameters in the language corresponding to policy considerations, what rights are enabled, and cross references to other regulations and permits. The parking officials specify the parameters governing what regulations apply in what geographic parts or blocks of the city. Thus, the parking officials would be able to state that a parking regulation for a loading zone has an exception when a parking account includes a "loading zone permit," but would be enforced differently when a parking account has only a "visitor permit" and so forth.

Another set of the services steps through all of the pending parking events. For example, certain parking restrictions may apply concerning street sweeping beginning at 2:00 pm. When 2:00 pm occurs, any status changes for the parking devices 21 and parking services kiosks 19 on the affected streets are determined, which can include setting their associated parking indicators 23 to signal "No Parking" Additionally, warnings may need to be sent to subscribed users, typically motorists who have parked on the affected streets, as well as information to parking authorities to guide them to parking violations. Still another set of the services take in new parking reservations, which can include comparing a request to park in a parking space 24 near a particular parking device 21 with other constraints on the use of that parking space 24.

Users interface with the parking services 12 either directly by using a parking device 11 or parking services kiosk 19. Users can also interface with the parking services 12 remotely over a network using a user device through a wired or wireless connection. User devices include mobile devices 15, 16, 17, such as smart mobile telephones, notebook or tablet computers, or similar personal electronic devices. The parking devices 21 and parking services kiosks 19 also have user interfaces that interact with the parking services 12. Yet another set of the services can download either parameters or application programs to the parking devices 21 and parking services kiosks 19 to drive interactions with users.

From a user's standpoint, the parking services 12 are accessible through parking devices 11 that are associated with one or more specific parking spaces, parking services kiosks 19 that are generally associated with a set of nearby parking spaces, and user devices that allow access to all of the parking spaces managed by the parking services 12. Functionally, parking services 12 are provided in five functional areas, which include parking event services 31 to handle parking events, driver services 32 that assist motorists in reserving a parking space 24 or other needs, resident services 33 that cater to the particular needs of urban denizens, merchant services 34 that enable local businesses to obtain parking for customers and related needs, and parking authority services 35. The specifics of each parking service functional area are further described infra. Other functional areas are also possible.

Parking services are provided through a set of parking accounts 37a-c respectively for drivers, residents, merchants, and operators of parking lots and valet parking services. For instance, in one approach, a special kind of parking account would be provided by the parking services 12 for parking valet services. In another approach, operators of parking valet services would be merchants and would have a special permit that was issued to them for valet parking. In both instances, valet parking services are able to reserve parking places for valet services and to access online valet services for locating and retrieving customer's vehicles. In addition, billing support for valet services could also be provided by the parking services 12, so that drivers could pay for their valet parking using their parking account 37a-c. The valet parking account would be set up to route the charges appropriately, charging the driver for the use of valet services and paying the valet service and the city or municipality from whom the parking was reserved accordingly. Other types of parking accounts are possible. The parking accounts 37a-c are maintained in storage 36 coupled to the parking services server 11. Express, temporary, and implicit parking accounts can also be used. An express parking account is the norm, whereas a temporary parking account is not permanently stored and an implicit parking account is generally created for a single parking event.

The parking accounts 37a-c provide a parking identity to motorists and other users, enabling transaction-based approaches to reserving, billing, and managing parking A parking identity can be established through a parking account 37a-c. A parking identification card can be issued for a parking account 37a-c. Alternatively, a credit card, driver's license, telephone calling card, or motor vehicle license plate number could be associated with a parking account 37a-c in lieu of a parking identification card. Additionally, a driver may have multiple parking identification cards for other family members or for loaning to guests temporarily. Finally, temporary parking identification cards may be issued by various organizations that cater to tourists, business travelers, and other people, such as tourism bureaus, rental car companies, and other organizations.

Users with parking accounts 37a-c can make parking reservations. The parking services 12 maintain a set of reservations 38a-d respectively requested on the basis of driver, recurring, guest, and special use needs. Other types of parking reservations are possible. During parking operations, the parking services 12 also track a set of parking events 39a-c respectively for occupancy, check-in, and holding a parking space 24 in real time. Other types of parking events are possible.

During operation, parking is consumed by real time requests 44 for parking from users, who are primarily motorists and the overall status 48 of parking availability is continually revised through the parking accounts 37a-c, sensor data 40, and parking device data 41. In addition, depending upon the type of parking sought, users may also physically submit parking permits or coupons 45, such as issued by a resident host or merchant, or electronically submit parking codes 46, which are processed and validated by the parking services server 11.

As required, availability indicators 43, user notices and parking alerts 43, and other information are sent out, either through a physical device, such as via a parking indicator 23 or the display 25 on a parking device 21, or by electronic transmission to user's mobile devices 15, 16, 17. Other types of input data or output information are possible.

Parking privileges can be added to a parking account 37*a-c* by a user at will. Parking privileges can be indicated by a physical permit that the user presents to a parking device 21, or using a digital tickets or permits that are electronically transmitted by the parking services 12. Parking privilege permits include permits for delivery vehicles, tourist vehicles, street cleaning exemption passes, fleet or bulk rate charges, special use, valet parking, taxicab parking, and other privileges. The privileges can include receiving bulk parking rates, priority parking, handicapped or senior citizen parking, special event or one-time use parking, such as would be helpful for tourists or other occasional visitors, and so on. Additionally, permits for using a parking space 24 for non-parking purposes, for instance, to provide a drive-up concierge or valet service or to facilitate road maintenance or building construction, could also be provided through a parking account 34*a-c*. Furthermore, monthly or periodic charges for parking could be billed directly to a credit card or through other pre-set payment arrangement as maintained in a parking account 37*a-c*.

The specific types of parking services 12 will now be discussed. Although each of the services is described in the context of a particular user, such as a driver or urban resident, the services are not limited to just that class of users and can be equally applicable to all other users, irrespective of specific characteristics, such as place of residence.

Parking Event Services

Service: Show Parking Availability

Figure 4:
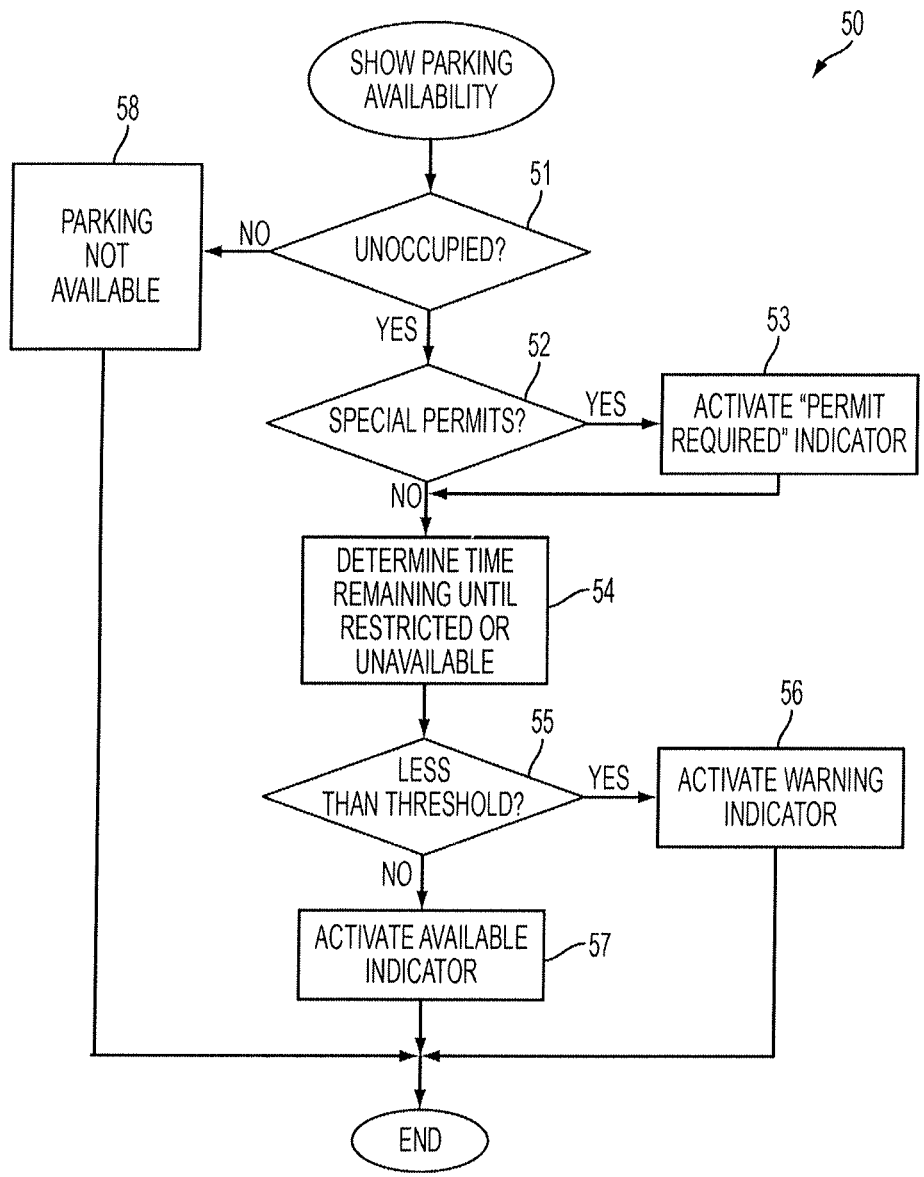
FIG. 4 is a flow diagram showing a routine for a show parking availability service for use in the parking services of FIG. 1.

Each parking space 24 has a display 25 showing its parking availability. FIG. 4 is a flow diagram showing a routine for a show parking availability service 50 for use in the parking services 12 of FIG. 1. This service is most apropos to non-valet service-related parking, although this service can be useful to a valet parking service when that service has to compete with the general public for available non-reserved on-street parking. If a parking space 24 is occupied (step 51), a parking not available indicator is displayed (step 58), although the parking device 21 or kiosk 19 may display a "Meter Expired" or similar notice or signal if a vehicle occupies the parking space beyond the allowed time. Otherwise, if the parking space 24 is unoccupied (step 51), the parking services 12 periodically determine whether any special permits are required to park in that parking space (step 52). A special "permit required" indicator is activated for the parking indicator 23 located at the parking space (step 53). The indicator can be provided through a combination of permit color, such as through a variation on the blue color used for handicapped parking permits, and further information identifying what permit is needed through the parking device's display 26. For example, parking indicator 23 could say, "Reserved at 2 pm" or "Valet Parking Only."

The time available for parking is then determined (step 54). The time remaining might be limited, for instance, due to an upcoming reservation for the parking space or under regulations that prohibit parking during certain hours for traffic throughway, requirements for a special permit, street cleaning schedules, or special events. If the amount of time available is less than a threshold (step 55), such as two hours, a warning indication can be used (step 56), such as through a cautionary yellow indicator. If the time available is more than the threshold (step 55), an available indication can be used (step 57), such as through a green indicator.

In one embodiment, the choice of colors and their assigned meanings can be varied. For example, one variation might use blue, rather than red, to indicate that a space is reserved. Other variations might use blinking colors, such as blinking red, to indicate a parking violation, blinking yellow and blue to indicate a reserved loading zone, and red with blinking blue to indicate a parking space reserved for a guest. Still other color variations are possible.

Service: "Log Occupancy"

Figure 5A:
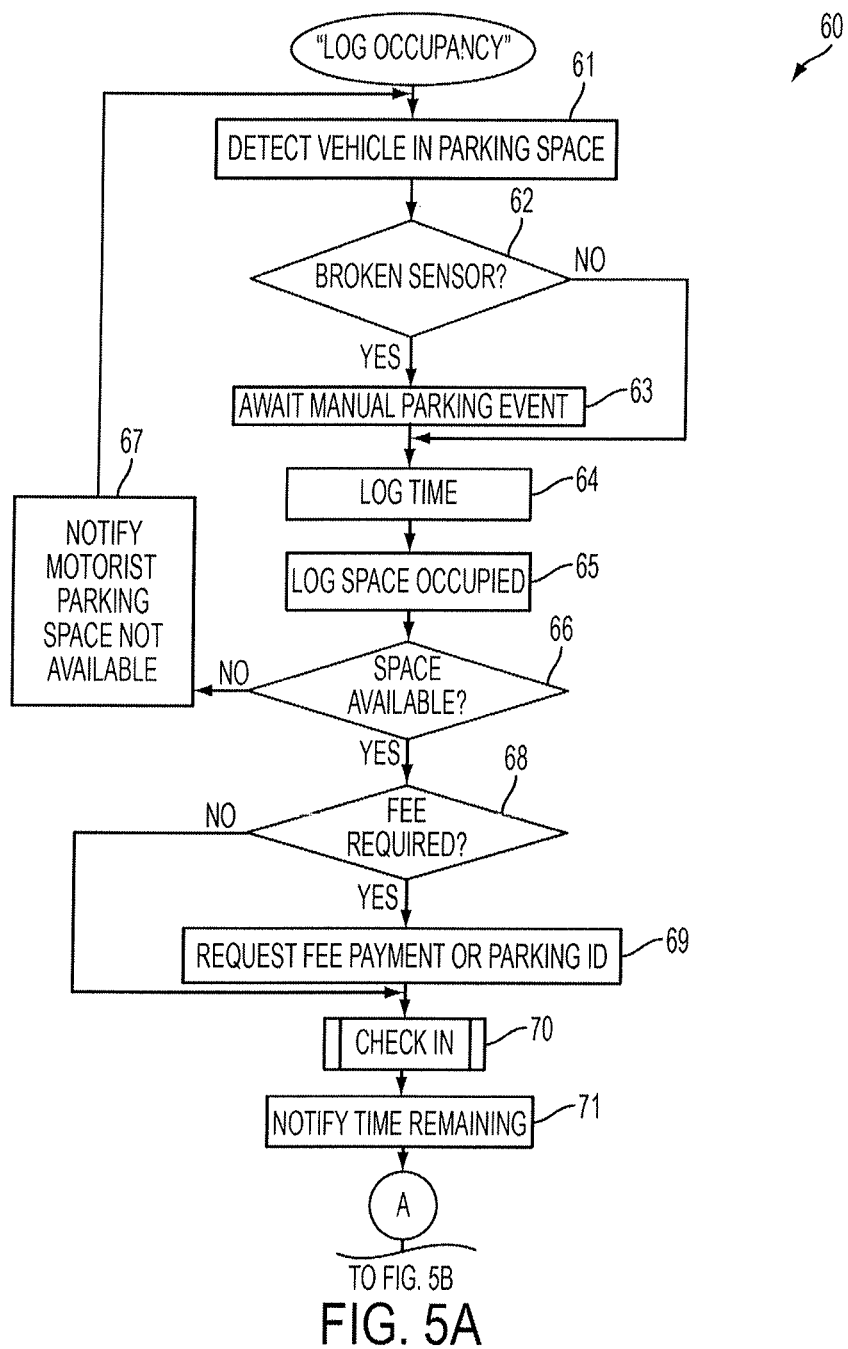
FIGS. 5A-5B are flow diagrams showing a routine for a "log occupancy" service for use in the parking services of FIG. 1.
Figure 5B:
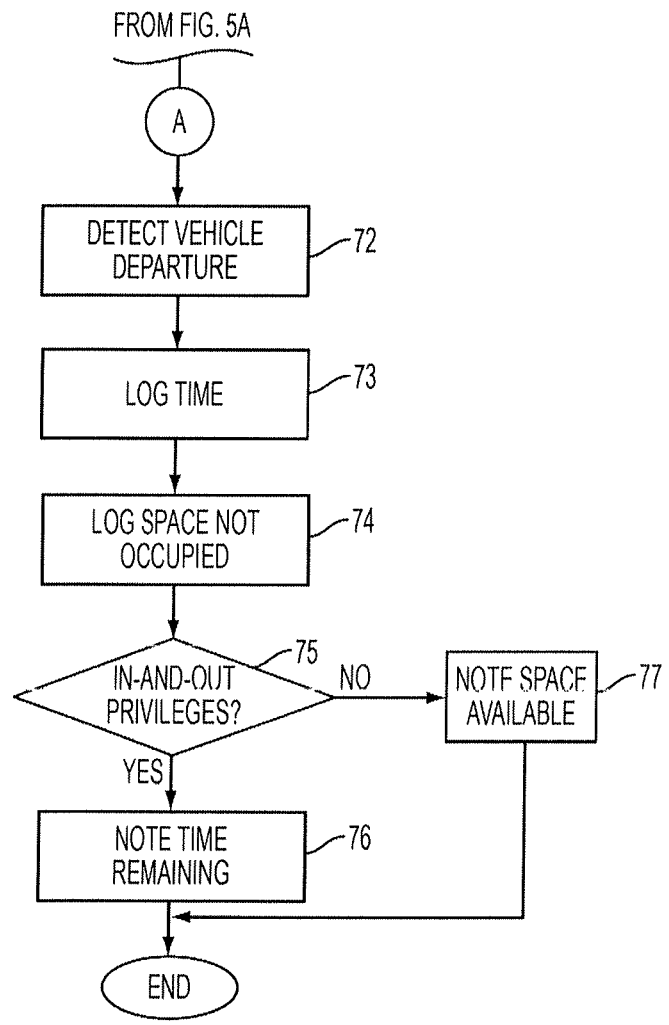

The "Log Occupancy" service notes when a vehicle has entered a parking space 24. FIG. 5 is a flow diagram showing a routine for a "log occupancy" service 60 for use in the parking services 12 of FIG. 1. In one embodiment, the bulk of the business logic runs on the servers. For example, in providing the "Log Occupancy" service, the interpretation of data from each sensor 22 to answer the question, "is there a vehicle present?" runs on the associated end-user device, while the remaining code executes on the server. Changes in the status pertaining to vehicle occupancy or vacancy are communicated to the server, which server then applies rules about what information to send back to the end-user device. For instance, the server must access the parking accounts 37*a-c* maintained in storage 36 to retrieve information about the motorist and the parking space reservation to determine whether "in-and-out" parking privileges or other considerations may apply. The server then sends a message back to the end-user device and requests the associated parking device 21 or parking services kiosk 19 to update the parking availability indicator 23 appropriately or display some other message.

This service begins when a sensor 22 detects that a vehicle is in the parking space (step 61). If the sensor is working properly (step 62), either the parking device 21, parking services kiosk 19, or the parking services 12 log the time that the vehicle entered the space (step 64) and that the space is now occupied (step 64). The information is relayed to the parking services 12, as applicable. If there is no parking sensor 22 or the sensor 22 is broken (step 62), the event can be started when a user manually provides a parking identity to the parking device 21 or electronically transmits a parking identity and indicates that parking has commenced (step 63).

Based on the parking status information maintained by the parking services 12, this event can now trigger other actions. For example, if the parking space 24 is not available (step 68), such as when the motorist has parked in a parking space 24 that has been reserved for someone else, the motorist can be notified that the parking space 24 is not available (step 67). Presumably, the motorist will immediately return to his vehicle and leave the parking space 24. However, if the motorist ignores the notification of parking space unavailability and tries to check in, the parking device 21 will disallow the check-in attempt and, if possible, offer a different parking space 24, as further described below with reference to FIG. 6. Otherwise, if the parking space 24 is available and a fee is required to park (step 68), the parking device 21 can remind the driver to pay the fee for parking (step 69), either by depositing coins or other form of payment, or providing a parking identity for billing. Following payment, the driver undertakes check in (step 70), as further described below with reference to FIG. 6. The driver can also be sent an alert 43 that states how long parking is permitted (step 71), such as by time remaining. This operation is typically followed by a "check in" service when the motorist approaches the parking device 21 or kiosk 19.

The "Log Occupancy" service also detects when a vehicle has left the parking space 24 (step 72). The parking device 21, parking services kiosk 19, or parking services 12 log the time that the vehicle left the parking space (step 73) and that the space is not occupied (step 74). The parking space 24 may be unoccupied, yet remain unavailable, such as where a recurring reservation exists for the now-unoccupied parking space 24. Thus, if in-and-out privileges for the parking space 24 exist (step 75), the parking indicator 23 shows that the parking space 24 is not available and the time remaining on the reservation is noted (step 76). Otherwise, the parking indicator 23 shows that the parking space 24 is now available for use (step 77).

When providing valet parking services, the "Log Occupancy" service checks whether the parking space 24 is still assigned for valet parking purposes whenever a car vacates a parking space 24. While still assigned, the parking indicator 23 displays a parking status indicating that the parking space 24 remains reserved for valet parking. Otherwise, the parking indicator 23 can revert to a normal state of non-valet parking availability. As well if the parking services 12 is providing online valet guidance services for a valet parking account, the parking services 12 can also send messages or update displays to indicate that the parking space 24 is available for valet parking.

Service: "Check-In"

Figure 6:
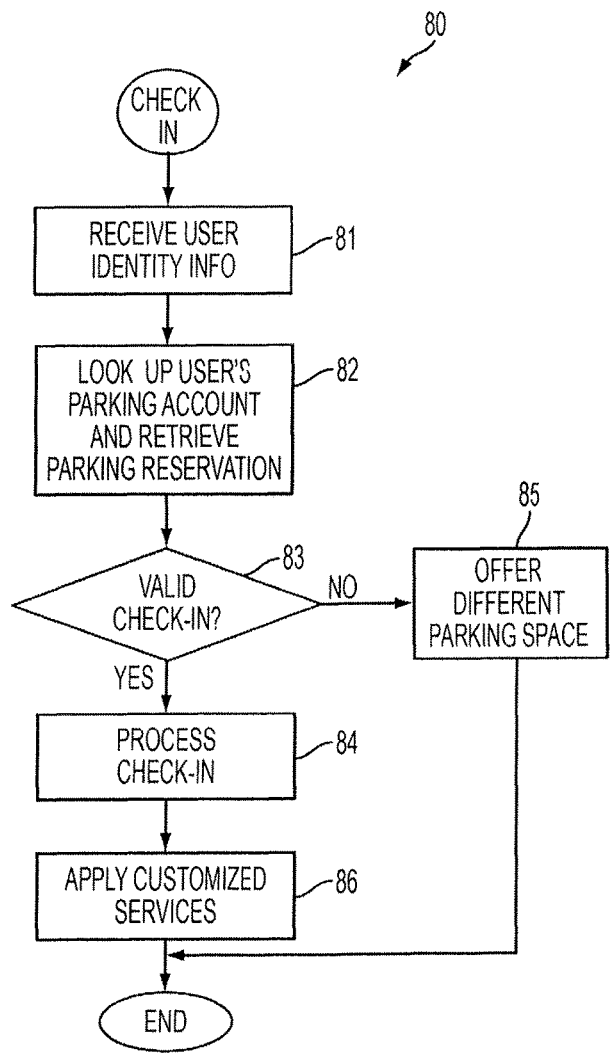
FIG. 6 is a flow diagram showing a routine for a "check-in" service for use in the parking services of FIG. 1.

The "Check-In" service is used when a motorist goes to a parking device 21 to provide a parking identity, or to request another service. FIG. 6 is a flow diagram showing a routine for a "check-in" service 80 for use in the parking services 12 of FIG. 1. Check-in is physically performed at a parking device 21 or, if applicable, a nearby parking services kiosk 19. Check-in could also be carried out electronically using a mobile device 15, 16, 17, such as a smart mobile telephone, notebook or tablet computer, or similar personal electronic device, that is connected to the parking information server 11 over a wired or wireless network. In one embodiment, the bulk of the business logic of check-in runs on the server, while the associated parking device 21 or parking services kiosk 19 scans the motorist's identification and sends back the scanned data. The server then processes the service request, including checking that the parking space 24 is available to the requesting motorist and is not already reserved to someone else. If the parking space 24 is not available to the motorist checking in, the server may attempt to locate an alternate nearby parking space 24, which is then displayed by the associated parking device 21 or parking services kiosk 19.

A motorist driving to a reserved parking space 24 out of which a previous motorist has not yet moved his car 24 could be sent a courtesy notice from the parking services 12 advising that the reserved parking space 24 is still occupied. The system could offer the incoming motorist a reservation of another nearby parking space 24 or provide compensation for the inconvenience, such as free parking, credit towards their next parking reservation, and so forth.

Check-in is started after a vehicle has been parked and when a user provides his parking identity (step 81) or other identifying information, either directly or remotely, to the parking services 12 after parking. Drivers are able to use any of several convenient approaches to provide their parking identity. For example, a driver could present a form of physical identification, such as a credit card, driver's license, or a parking identification card, through a magnetic card reader or other input device integrated into the parking device 21. Alternatively, the parking device 21 may employ biometric input, such as a fingerprint or retina pattern scanner. The parking device 21 could also include a camera or other input device to visually read the license plate of a motorist's vehicle, a wireless transponder to retrieve a radio frequency identification (RFID) tag on the motorist's vehicle, or other sensor to identify the vehicle parked and the user's parking identity derived from his vehicle information.

If the parking space is already reserved 24, the system must check that the driver is allowed to check in. In the simplest case, the driver checking in is the person, or is a person who has the same account as the person, who made the reservation. If the driver is disallowed from checking in, such as where the parking space 24 is already reserved for somebody else, the system could offer to reserve a nearby parking space for their convenience.

For parking spaces 24 reserved for valet parking services, the "Check-In" service verifies that a valid "valet parking" identification is used for check-in. If online services are being provided for a valet parking account, the system could also send messages or update displays to indicate that the parking space 24 has been reserved for valet parking use.

The parking services 12 use the motorist's parking identity to access the corresponding parking account 37a-c and retrieve his parking reservation (step 82). The parking services 12 determines whether the parking reservation is valid (step 83). For instance, if the parking space 24 is already reserved for somebody else, check-in will be disallowed and, if possible, the parking services 12 will offer a different parking space 24 (step 85). If valid, check-in is processed (step 84) by matching the motorist and vehicle identities to the reservation. As well, providing a parking identity to the parking services 12 at check-in enables the server to customize and apply the parking services offered to the user based on settings in the user's parking account (step 86). For instance, if a motorist has a permit that overrides time constraints that would otherwise limit the parking time, the parking services 12 would cause the parking device 21 or parking services kiosk 19 to display the time available, taking into account any permits, or digital tickets or permits, as further described infra, that are associated with the motorist's parking account 37a-c. Check-in also enables a user to simply pay for parking, either by cash or with a credit card, without establishing a parking account. This operation is typically followed by a "Hold This Space" service, as further described below with reference to FIG. 7.

A short vacancy period may be allotted between occupancies of a parking space 24 to allow a safety margin in case the previous occupant is late in moving his vehicle. When appropriate, the parking services 12 can enable guided enforcement, as further described below with reference to FIG. 23.

Notwithstanding, traffic enforcement authorities or the tow truck may be delayed, or other circumstances may intervene, so that a reserved parking space is still occupied when a driver with the reservation arrives. To promote customer satisfaction, various remedies may be offered to assist the inconvenienced driver. For example, the parking services 12 may automatically reserve another available nearby parking space 24 for the driver, which could even be a parking space 24 that normally requires a special permit. Alternatively, the driver could be offered financial compensation for the inconvenience. As well, a valet could be provided at the occupied parking space 24 to take care of parking the driver's car and providing him with transportation to and from the new parking space 24. Still, other forms of remedy are possible. Finally, the level of remedial compensation may be keyed to a parking service level analogous to airline reservations, which offer economy, business, and first class service levels.

During the use of the parking space 24, parking services 12 monitor whether the parking space 24 continues to remain occupied. However, even when unoccupied, availability may depend upon whether a reservation with in-and-out privileges or other constraints on the use of the parking space 24 exist. Parking services 12 can monitor the passage of time or poll each parking device 21 and parking services kiosk 19 for changes in parking status. Parking services 12 could alert also the motorist of impending expiry of parking and either alert the motorist to move his car, or offer an extension of time, if feasible, as further described supra. Alternatively, the parking device 21 or parking services kiosk 19 could track changes in parking status and monitor the passage of time locally, which would be periodically reported back to parking services 12 when polled. Other ways to track changes in parking status and monitor the passage of time are possible.

Service: "Hold this Space"

Figure 7:
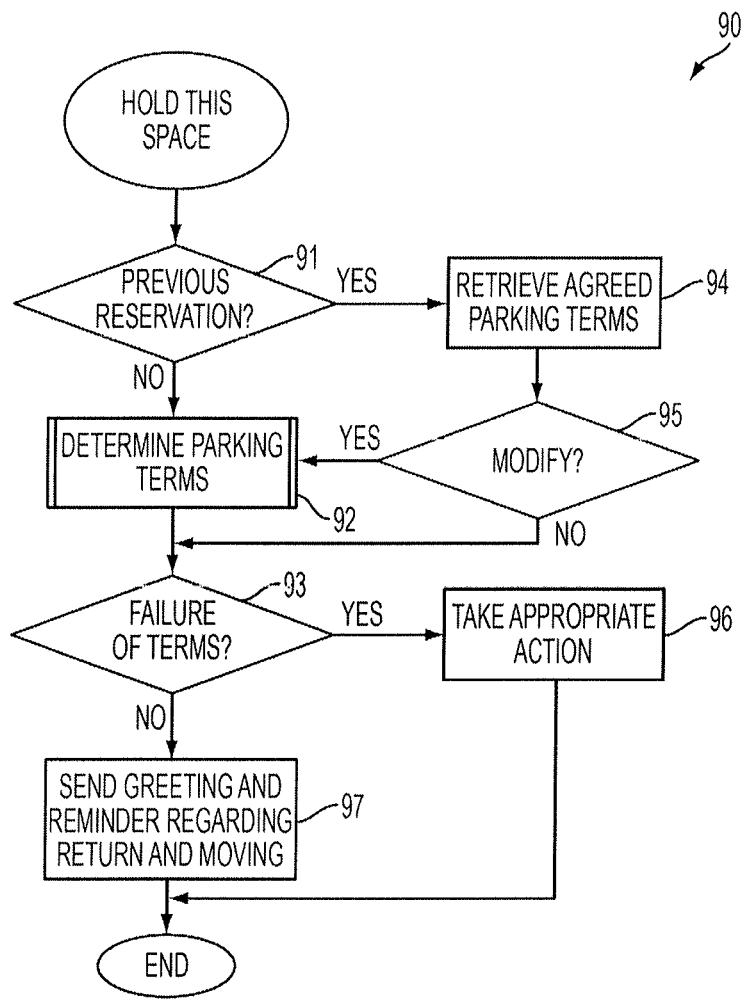
FIG. 7 is a flow diagram showing a routine for a "Hold This Space" service for use in the parking services of FIG. 1.

The "Hold This Space" service allows a driver to establish an agreement about parking a vehicle in a parking space. FIG. 7 is a flow diagram showing a routine for a "Hold This Space" service 90 for use in the parking services 12 of FIG. 1. Where the driver had a previous reservation and the check-in confirmed that the driver is authorized (step 91), the parking services 12 retrieve the terms previously arranged in the reservation (step 92) and the driver is offered the option of modifying the terms (step 93). If no reservation was made (step 91), or the driver decides to modify existing reservation terms (step 93), the applicable parking terms are determined (step 94), as further described below with reference to FIG. 8.

The parking services 12 can summarize the parking agreement for the driver. If the driver is in violation or fails to fulfill the terms of the parking agreement (step 94), such as where the driver is not authorized to park there, has not paid the required parking fee, or does not move his vehicle within short grace period, the parking services 12 can automatically take appropriate action against the offending driver (step 96), including alerting parking authorities about the parking violation, logging the violation, or otherwise enabling guided enforcement, as further described below with reference to FIG. 23.

If the terms are acceptable and the driver compliant (step 94), a greeting can be sent to the driver, along with a reminder about when he is expected to return and move his vehicle (step 97). Otherwise, if the driver is in violation or non-compliant, the system could optionally offer the driver other parking.

Figure 8:
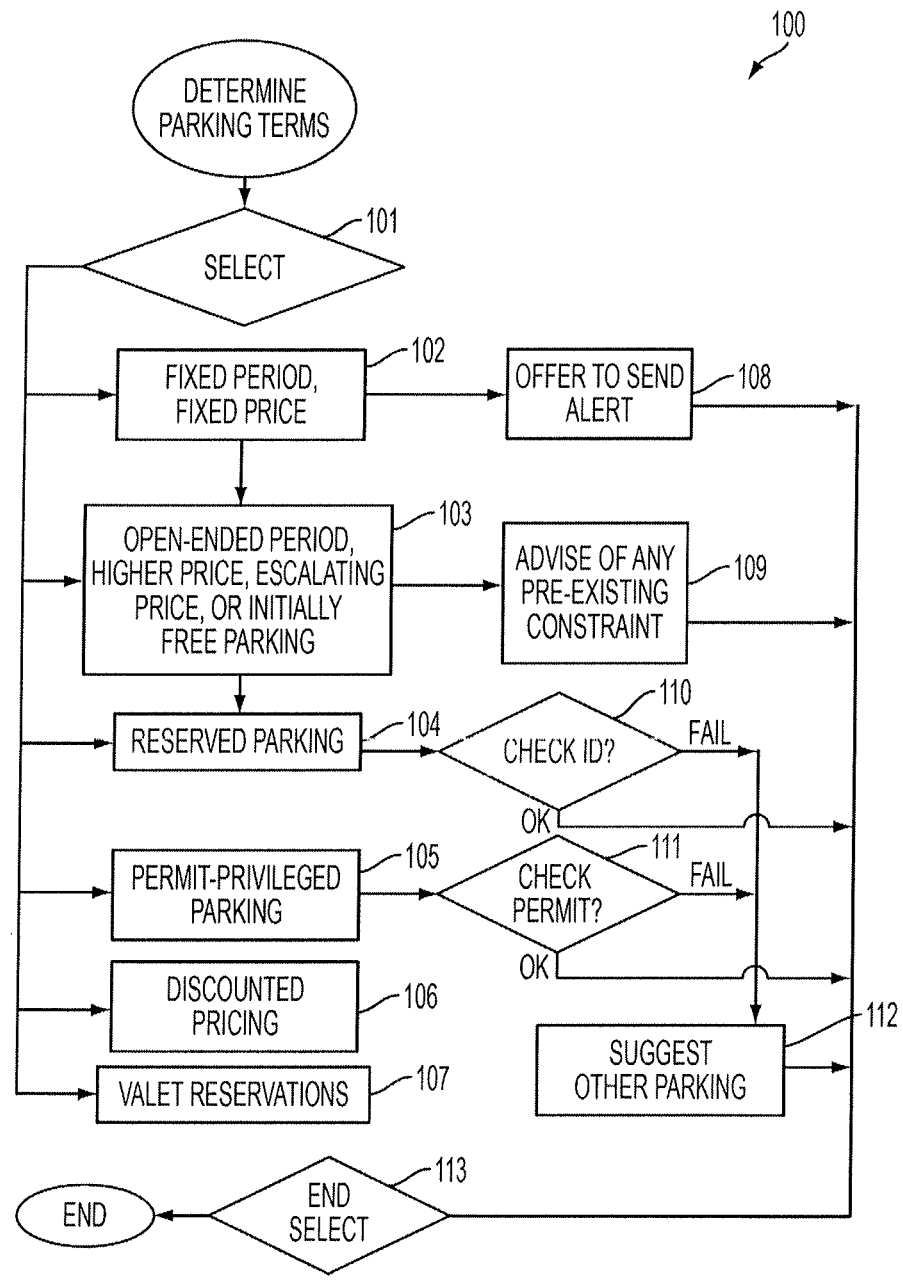
FIG. 8 is a flow diagram showing a routine for determining parking terms for use in the routine of FIG. 7.

The parking terms can offer different parking options. FIG. 8 is a flow diagram showing a routine 100 for determining parking terms for use in the routine 90 of FIG. 7. At the time of making a parking reservation or check-in, the driver selects the terms of the parking agreement (steps 101-113). By way of example, the parking options include:

Fixed period, fixed price (step 102). The driver could select to pay for a fixed rate for a fixed period of time. Under this option, the driver must move his car before the end of the parking period. The driver could ask to be alerted (step 108) via an electronic message that will be sent to a mobile device 15, 16, 17 when the parking period is nearly over, such as by using contact information known to the parking services 12 under the driver's parking identifier. In some cases, the driver may later be permitted to extend the fixed parking period from his mobile device 15, 16, 17, as long as other time constraints still allow parking.

Open-ended period, higher price (step 103). The driver could opt for an open-ended parking period. Under this option, the driver does not provide an end time and parks for as long as needed, subject to pre-existing availability constraints on the parking space. The driver is informed of any pre-existing constraints (step 109), for instance, other parking reservations or scheduled street cleaning. The convenience of open-ended parking times may have a higher fee since the parking space is locked up and unavailable to other motorists for an indefinite period.

Open-ended period, escalating price (step 103). As a variation on the open-ended period, higher price parking option, the price-per-minute for a parking space could proportionately rise as a vehicle is parked for an increasingly longer period. This approach could be used, for instance, in shopping districts where commerce generally benefits from turn-over in the vehicles parked in that area. For example, the first hour of parking might cost a dollar; the second hour might cost two dollars; the third hour might cost ten dollars.

Open-ended period, initially free parking (step 103). In another variation on the open-ended period, higher price parking option, a first period of parking might be free, potentially subsidized by merchants located on the same city block as the subsidized parking Thereafter, parking fees might begin after, for instance, thirty minutes. User check-in could still require a credit card, with billing to take place according to the already established parking rules.

Reserved parking (step 104). If the parking space is reserved, the parking device 21 could request the driver to confirm his parking identity. If the driver's parking identity does not match the reservation (step 109), the parking device 21 or parking services 12 could inform the driver that he needs a valid reservation and that he must move his vehicle from the parking space 24. As a courtesy, the server could also provide a recommendation of another place to find parking (step 112) and could allow the motorist to reserve an alternative parking space using their parking identity.

Permit privileged parking (step 105). If the parking space requires a special permit and the driver's parking account 37*a*-*c* lacks the required permit (step 111), the parking device 21 or the parking services 12 could inform the driver that a permit is required and that he must move his vehicle from the parking space 24. As a courtesy, the server could also provide a recommendation of another place to find parking (step 112) and could allow the motorist to reserve an alternative parking space using their parking identity.

Discounted pricing (step 106). Various bulk discounts may apply where associated with a permit in driver's parking account, or through an associated fleet parking account.

Valet Reservations (step 107). For valet parking services, parking reservations are most conveniently made for a group of parking spaces 24, which are collectively reserved all at the same time. Alternatively, a valet service could either compete for available on-street parking or just reserve a number of parking spaces 24 with in-and-out privileges. The preferred approach is that each valet service pays to reserve a group of parking spaces 24 for their use. Each valet service essentially subleases the parking spaces 24 for the duration of their valet service needs. This approach benefits the valet service by assuring that an inventory of parking spaces 24 is kept available and is not used by other valet services or the general public. The city or municipality also benefits from the receipt of additional revenue. To ensure that the public is not disserved by over-reserving of parking spaces for valet parking services, the city or municipality could have a policy that a certain number of parking spaces remain available.

Throughout the duration of a valet parking event, such as during the course of an evening, parking valets may move various cars in and out of the valet services-reserved parking spaces 24 and a single car may end up occupying several different parking spaces 24 at various times during the same event. For example, a valet may move a customer's car to a more convenient location just before he anticipates the return of the customer, thereby saving the customer waiting time. Valet parking reservations also differ from typical consumer parking reservations in that the reserved parking spaces 24 are generally intended to be available for any of the valets, any of which may be the driver of a valet-parked vehicle at the time of parking, relocation, or retrieval. In one approach, the valets would assign distinct identification cards for each of their patron's cars to enable them to easily keep track of where each patron's car was parked.

For valet parking, interactions are streamlined for customer convenience. For instance, a valet parking space would continue to be reserved for valet use generally, even after a valet has removed a customer's vehicle from that parking space. Requiring a valet parker to perform a "Hold This Space" transaction, perhaps in addition to a "Check-In" transaction, can be skipped, as holding a parking space already reserved is redundant.

Driver Parking Services

Service: Reservation.

Figure 9:
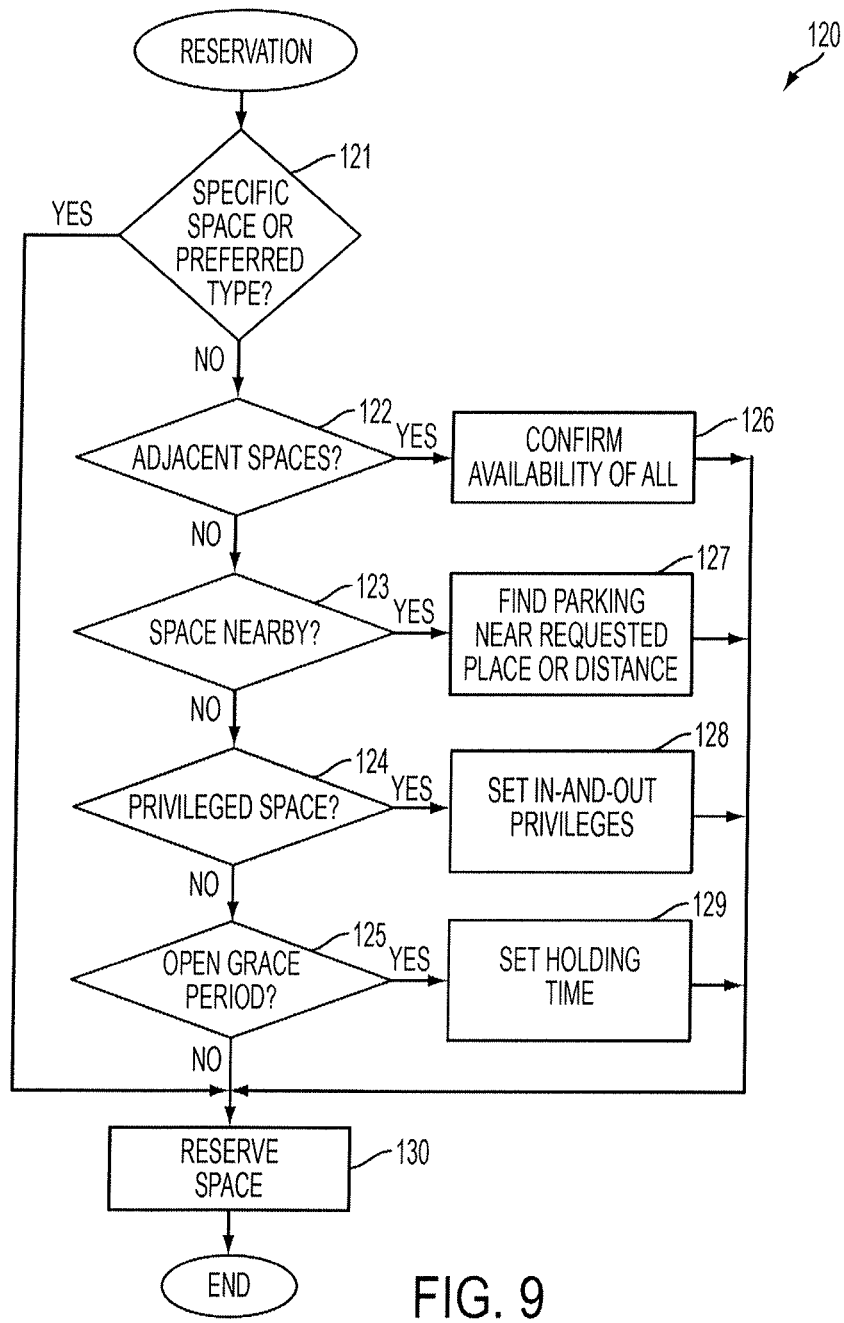
FIG. 9 is a flow diagram showing a routine for a reservation service for use in the parking services of FIG. 1.

The reservation service reserves a parking space. FIG. 9 is a flow diagram showing a routine for a reservation service 120 for use in the parking services 12 of FIG. 1. As described supra for the "Hold This Space" service 90, a parking reservation 38*a-d* can be for a fixed parking period, for an open-ended period, or as various permits allow. Additionally, a parking reservation 38*a-d* may be for a specific parking space 24 or for one of a set of parking spaces.

Allowing users to reserve parking ahead of time raises several issues. Typically, when a driver leaves a parking space 24, the parking space 24 becomes available for other motorists to use. However, some drivers may want in-and-out privileges that could be provided through a reserved parking space for a recurring purpose. For example, a driver may need to reserve a parking space 24 for nighttime parking, but then need to leave sometime during the night to run an errand. That driver would ordinarily want that parking space 24 to continue to be reserved for him, so that parking is available upon returning from the errand.

As well, unused yet reserved parking wastes the parking resource. Plans sometimes change and motorists that make reservations for parking spaces 24 may end up not actually using the parking To avoid such waste, the parking services 12 could return a parking space 24 to public availability if the driver who reserved the parking space does not check in promptly. Parking spaces 24 could have a short grace period for arrival and check-in. As well, drivers could pay a higher fee to hold a parking space throughout the entire reservation period, which will apply even if they do not show up.

In another variation, a driver could be sent an alert by telephone, text message, or other means if a grace period for a reservation is about to expire. This message could be handled by a GPS-equipped device, such as an on-board navigational or informational devices 17, in the vehicle. The driver, or a computational agent for the driver, would have a window of time during which to respond to the alert by telling the parking service that they still need the parking space. The driver could be asked to pay an extra charge to continue to hold the parking space if parking is in high demand or for other reasons warranting an up charge to the parking.

Parking spaces 24 can be reserved directly through the parking services 12 or indirectly through a parking device 21, parking services kiosk 19, or mobile device 15, 16, 17. By way of example, parking space reservations include:

Reserve a specific parking space (step 121). This option reserves one specific parking space 24.

Reserve a preferred type of parking space. The parking reservation system may differentiate parking spaces according to their type. For example, parking spaces requiring parallel parking may be less desirable than those spaces where parking is at an angle to the curb. Similarly, some parking spaces may be longer, wider, or otherwise more easily usable for parking than other parking spaces that require comparatively more involved maneuvering of a vehicle.

Reserve adjacent parking spaces (step 122). This option reserves several adjacent parking spaces, such as needed for parking an oversize vehicle, trailer, recreational vehicle, limousine, or moving van. Grant of the parking reservation requires confirmation that all of the parking spaces requested are available for the term of the reservation (step 126).

Reserve a parking space near or within a given distance of a location (step 123). A driver may not necessarily need a specific parking space (step 121) and may be satisfied with a parking space 24 on a particular block or side of the street or that is within a given distance of a particular location. The parking services 12 attempt to find a suitable parking space 24 for the driver (step 127), who may then enter a reservation.

Reserve a parking space with in-and-out privileges (step 124). This option keeps a parking space 24 reserved throughout the duration of a reservation period (step 128), even if the driver leaves for a while during the period. Another check-in step would be required when the driver returns.

Open grace period (step 125). This option holds a parking space reservation open (step 129), even if the driver is late and does not arrive within an allotted arrival and check-in grace period.

Where a reservation is for any of a group of parking spaces 24, the process used by the parking services 12 for setting the parking indicators 21 proximate to the parking spaces factors in the affect on the availability of the overall group. For example, suppose that there are two parking reservations in effect for parking spaces 24 on the same block and that ten of the twenty parking spaces are already occupied by cars. In this situation, the parking services server 21 can show all ten of the unoccupied parking spaces 24 as available. However, as the number of available unoccupied parking spaces 24 decreases, the parking indicators 21 need to reflect the affect of the two parking reservations. When only two unoccupied parking spaces 24 are left, the parking services 12 show those spaces as being unavailable to hold the spaces for the reservations. Suppose that three parking spaces 24 were unoccupied and that a car began to pull into one of those parking spaces 24. The remaining two parking spaces would then show as unavailable.

If all conditions are met, the parking services 12 reserve a parking space 24 for the driver (step 130), which can be confirmed to the driver (step 131), for instance, by an automated message sent to the driver's mobile device 15, 16, 17, if available and registered with parking services 12.

Service: Extend Reservation

Figure 10:
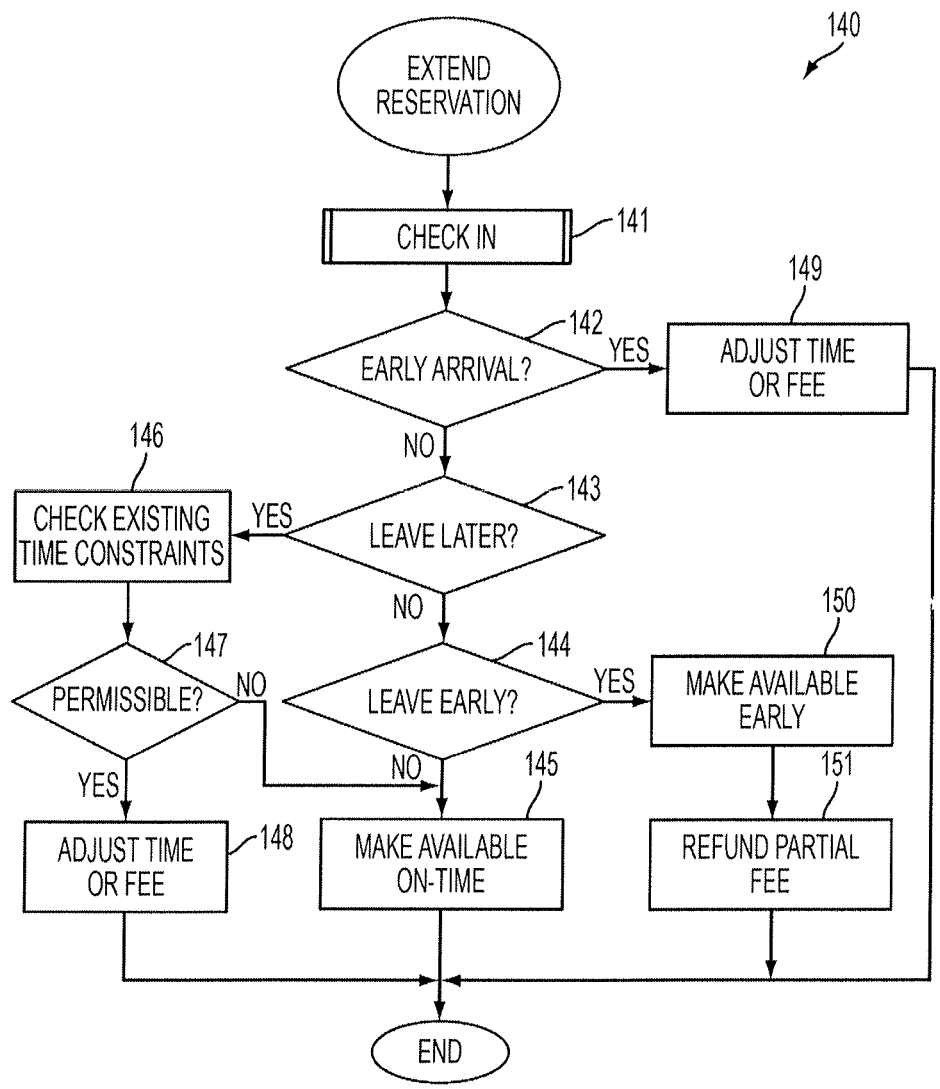
FIG. 10 is a flow diagram showing a routine for an extend reservation service for use in the parking services of FIG. 1.

Parking reservations give a specification of the time over which a parking space 24 is reserved. FIG. 10 is a flow diagram showing a routine for an extend reservation service 140 for use in the parking services 12 of FIG. 1. A parking reservation is executed when the motorist checks in (step 141), as described supra. If a motorist arrives early for his reservation 38a-d and the parking space 24 is available (step 142), the starting time of the reservation begins earlier than planned. The parking services 12 adjust the parking period and fee appropriately (step 149) and can confirm the revised end time and other parameters with the driver.

Alternatively, if a motorist wants to extend a parking stay longer (step 143), that is, he wants to leave at a later time, the parking services 12 will check for any existing time constraints (step 146). If permissible (step 147), the parking services 12 adjust the parking period and fee appropriately (step 148) and can confirm the revised end time and other parameters with the driver. Otherwise, the motorist will be informed that extended parking is not available. For purposes of resource management, the parking services 12 use available information to inform drivers about parking availability. In estimating how long a vehicle will be in a parking space 24, a conservative approach assumes that the parking space 24 will not become available until the end of the parking period (step 145) as specified in the terms of parking agreement. If the parking terms allow parking for up to three hours, a conservative parking policy prevent the parking services 12 from showing the parking space 24 as being available for other parking reservations before the end time. However, if a driver leaves early (step 144), the parking space 24 can be made available immediately to other drivers and, if policy permits, the departed driver can be refunded a partial fee (step 151).

Pricing policies as implemented through the parking services 12 can take advantage of the dynamics of drivers arriving early, staying later, or leaving early. For example, a driver considering convenience and peace of mind may choose an option to stay for up to three hours, even if he expects to be finished in two hours. Reserving a parking space 24 for only two hours would cost less, but the driver risks the need to hurry back if delayed. In one embodiment, the parking services 12 can warn a driver via a mobile device 15, 16, 17 that the two-hour limit is approaching. If the space is still available beyond the two-hour limit, the driver could be offered the option to extend the parking reservation.

Service: "Find My Car"

Figure 11:
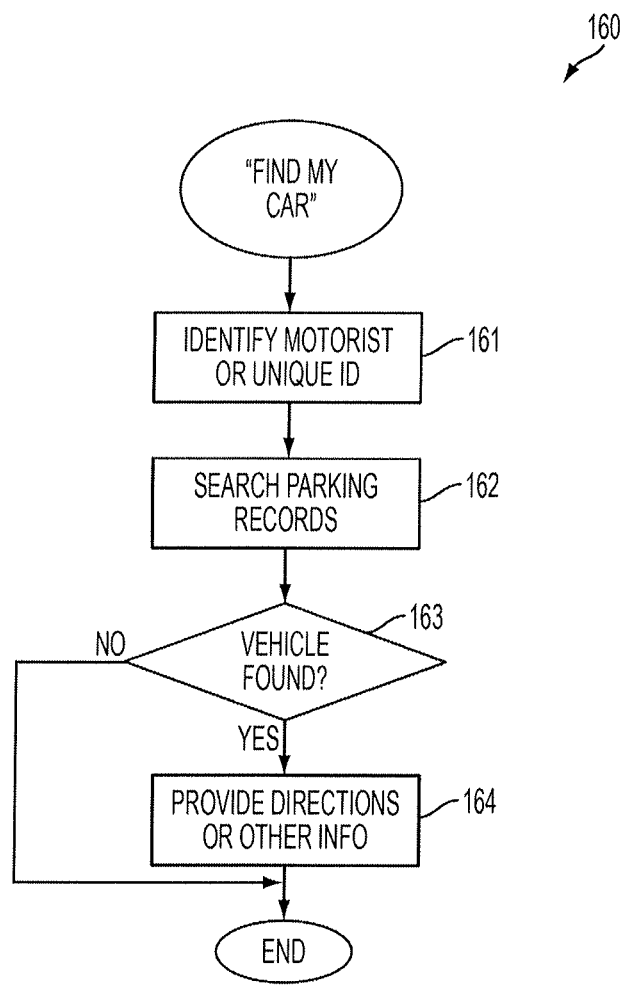
FIG. 11 is a flow diagram showing a routine for a "Find My Car" service for use in the parking services of FIG. 1.

People sometimes forget where they parked. Since the location of every parking space 24 is known by the parking services 12, the information can be used to help forgetful drivers find their lost cars. FIG. 11 is a flow diagram showing a routine for a "Find My Car" service 160 for use in the parking services 12 of FIG. 1. If in need, an absent-minded driver could go to any parking device 21 or parking services kiosk 19, or could contact the parking services 12 using a mobile device 15, 16, 17. The driver would check-in, and ask the server for his car's location. The parking services 12 would confirm the driver's identity (step 161) and search the parking records (step 162). If the parking space 24 occupied by the vehicle is found (step 163), the driver could be provided a map, audio, or visual directions for finding his car. For persons without parking identities, the parking services 12 could still provide the driver with directions upon providing sufficient information to enable the parking services 12 to find the car, such as by entering a unique identifier assigned to a parking device 21 (step 161).

Service: Summon a Taxicab and "Find Me Public Transportation"

A parking device 21 or parking services kiosk 19 could also be used to summon a taxicab. Based on the location of the requesting parking device 21, a taxicab service could give an estimated time of arrival and fare estimates for travel to a specified destination. The taxicab service could be summoned through an interactive application executed on the parking device 21, or by message-based or voice telephone call. Payment for the taxicab could also be automatically arranged ahead of time through the user's parking account 37a-c. In a further embodiment, a user could request a taxicab and run an auction for taxicab services to respond at a specified level of service. The user could then pay for the winning taxicab service through the parking device 21 and enter into a pre-arranged fare agreement with the taxicab.

In addition, a parking device 21 or parking services kiosk 19 could be used to find public transportation for a user. Like the service for summoning a taxicab, this service is location-based and uses the location of the parking device 21 or parking services kiosk 19. The parking services 12 tie in to bus, train, ferry, subway, and other public transportation schedules and could recommend a route for the user. The parking identity could be generalized to a transportation identity, which allows the holder to purchase tickets for public transportation, as well as pay for taxicab fare.

Service: Summon Help (911)

Each of the parking devices 21, as well as parking services kiosks 19, are networked with the parking services 12. Thus, drivers and other people could use the parking devices 21 and parking services kiosks 19 to call for help during emergencies. For example, a person could open voice or voice and video connection to emergency authorities, depending upon the configuration of the parking device 21. Further, if a camera is incorporated into the parking device 21, the parking services 12 could capture photographs from the requesting or neighboring parking devices 21 to document the event.

Resident Parking Services

Service: Recurring Reservations

Figure 12:
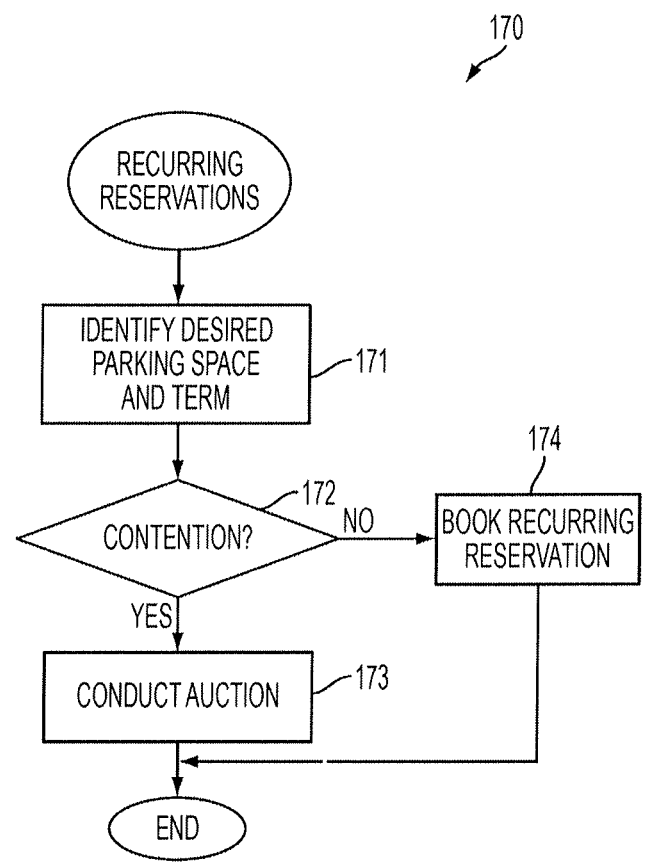
FIG. 12 is a flow diagram showing a routine for a recurring reservations service for use in the parking services of FIG. 1.

Some parking needs are recurring. For example, residents may find reserving nighttime parking on the street, either in front of their homes or nearby, convenient. The recurring reservation service enables a user to reserve a parking space 24 for a repeating, typically hourly, period for set each day throughout a subscription period, such as by the week or month, which is particularly useful in urban settings and other residential areas where residents have to seemingly compete constantly with everybody else to find parking. FIG. 12 is a flow diagram showing a routine for a recurring reservations service 170 for use in the parking services 12 of FIG. 1. To book a recurring reservation, an urban resident identifies a desired parking space and reservation term (step 171). The parking services 12 confirms the resident's eligibility and checks whether there are constraints that prevent the recurring reservation from being booked. For example, use of the parking space 24 may require a special permit, such as for handicapped parking, or the resident may try to reserve a parking space 24 that is not available because the space is already scheduled to be in use. Additionally, some parking spaces 24 may not allow recurring reservations at all. For example, the space located at the curb cut of a private driveway can only be recurrently reserved by the resident himself, unless he chooses to rent the parking space, as further described infra. Furthermore, limits on the length of the subscription may restrict whether a motorist can make a recurring reservation.

If the reservation term is clear of any pre-existing time constraints and no contention with other residents is discovered (step 172), the parking services 12 book the recurring reservation for the resident (step 174). In an urban neighborhood, though, contention may be more the rule than the exception and several residents may want the same parking spaces 24. To ensure an orderly and fair process of booking recurring reservations in an urban neighborhood, the parking services 12 can impose a scheduled period for conducting an auction for the contended parking space 24. For example, the auction may take place on the first day of each month. Prior to the date of auction, residents can enter their bids. Special privileges may apply for homeowners, elderly residents, the handicapped people, and so on. As well, the bidding residents need not be present for the online auction, which can occur automatically. At the time of auction, the parking services 12 evaluate at the bids and assign a winner. All of the bidders are notified. The winning bidder gets the recurring reservation. A delay period between the running of the auction and the time at which the first usable parking reservation takes effect for the winning bidder may apply. Several auction-based approaches may be used (step 173), which, by way of example, include:

Space Auction. Contracts for particular parking spaces 24 may be brought up for auction on a regular basis. Interested parties could be informed by the parking services 12 with the highest bidder gets the parking space 24.

Multiple-Allocation Auction. An allocation process can be used, where residents specify several parking preferences and bids. The parking services 12 allocate parking spaces 24 to balance the residents' needs and revenue.

Auction with Subsidies. A subsidy or advantage is given to particular residents to for various reasons, such as location or to compensate for disadvantages or other inequities. For example, a substantial advantage may be awarded to handicapped or elderly people to enable them to park near their residence. Alternatively, an advantage may be given to people living closest to a parking space 24 under auction.

The various auction-based approaches could take into account the number of parking reservations existing on a particular city block or in a region associated with a bidder and limit the number of parking spaces 24 that one resident could hold. In addition, a parking space 24 could have an escalating price per vehicle for recurring reservations to discourage a resident from monopolizing the parking on a city block with only his own vehicles.

Service: Guest Reservation

Figure 13A:
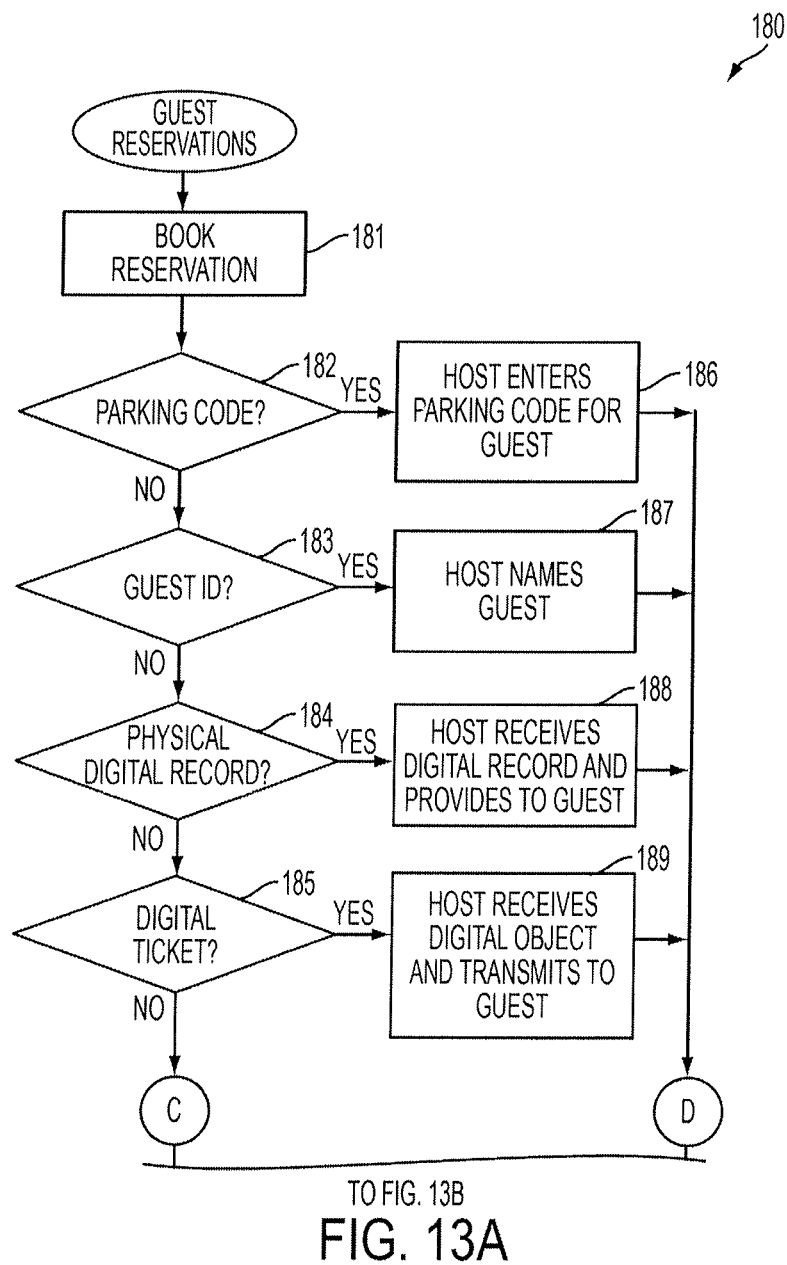
FIGS. 13A-13B are flow diagrams showing a routine for a guest reservation service for use in the parking services of FIG. 1.
Figure 13B:
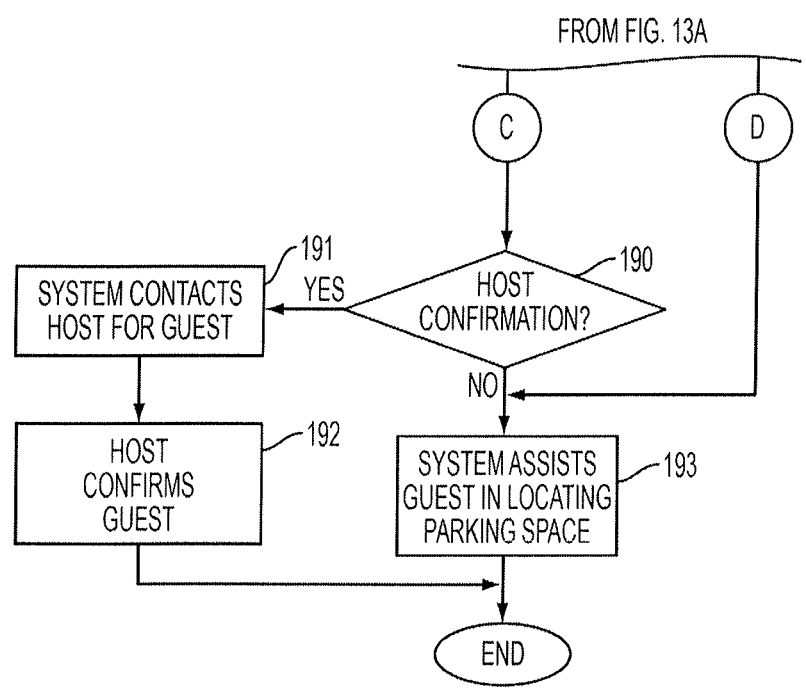

The guest reservation service accommodates making a parking reservation for a guest. FIG. 13 is a flow diagram showing a routine for a guest reservation service 180 for use in the parking services 12 of FIG. 1. This service differs from a regular reservation in that the parking services 12 need to validate a possibly unknown guest when they park. In several of these approaches, the parking services 12 can provide a grace period for the host and guest to carry out the validation process.

Several approaches can be used to enable the guest to check in when they have parked. By way of example, the approaches include:

Parking Code (step 182). When a host creates a guest reservation (step 181), the parking services 12 generates a parking code, such as a four-digit number, that the guest can enter into a parking device 21 or parking services kiosk 19 at check-in present. The parking code can be generated in various different ways. The parking code is given to the host, which he can pass on to the guest or enter himself (step 186).

Guest Identification (step 183). When a host creates a guest reservation (step 181), the host can provide the name of the guest (step 187). If the parking identity of the guest is known to the parking services 12 by virtue of having a parking account 37a-c, the guest can use his parking identity or other identification during check-in.

Physical Digital Record (step 184). When a host creates a guest reservation (step 181), the parking services 12 send the host a bar code or other unique digital record (step 188) that can be physically reproduced for the parking event, generally by print out by the host or the guest, together with directions for finding the parking space 24. The guest presents the printout using the user interface of a parking device 21 at check-in.

Digital Ticket or Permit (step 185). When a host creates a guest reservation (step 181), the host receives a digital object, possibly encrypted, which is electronically transmitted to the guest (step 188). The guest presents the digital ticket or permit to the parking services 12 at check-in through transmission from a mobile device 15, 16, 17.

Host Confirmation (step 190). The validity of a guest could be confirmed by the host. The parking services 12 contact the host when the parking event occurs (step 191), or the guest contacts the host directly, such as by mobile telephone. Alternatively, the parking device 21 could open a voice, text message, or video connection to the host. The host then would confirm via a networked device that the vehicle in the parking space belongs to the guest (step 192).

In a further embodiment, a host is permitted to make reservations for multiple guests at the same time. For example, the host could reserve a group of parking spaces 24 and get a single parking code or digital ticket or permit for all guests. A guest could park in any of the available parking spaces 24 in the group.

The parking services 12 also can help guests find their reserved parking spaces 24 (step 193). In the simplest case, the parking spaces 24 may simply be labeled. However, labels may be difficult to see at night. Alternatively, the parking services 12 could cause the parking indicators 23 to flash using, for instance, red-and-green lights, to draw the attention of the guest searching for the parking space 24. The flashing behavior could begin at the beginning of the parking reservation period. The parking services 12 could also flash the lights on or give some other indication using a parking device 21 or parking services kiosk 19 when the guest gets near the parking space 24 or requests additional assistance. The request could be made via an application on the guest's mobile device 15, 16, 17 or just be triggered by the start time of the guest reservation.

If the parking reservation was communicated electronically, such as by email or text message, a map could be included by the parking services 12, as well as GPS coordinates for the parking space 24, which could both be transmitted into a GPS application in the guest's mobile device 15, 16, 17 to guide the guest to the parking space 24. The mobile device 15, 16, 17 may itself be able to alert the guest that they are near their guest parking space 24, or could send a signal to the parking services 12, parking device 21, or parking services kiosk 19 to ask that a parking indicator 23 or other indication be enabled to guide the driver in. As well, the guest could be given a telephone number to call shortly before reaching the area to request that the indicators begin flashing. The GPS coordinates of the parking space 24 could also be provided to applications executing on on-board navigational or informational devices 17 in the guest's vehicle or on a mobile device 15, 16, 17 to provide maps, audio, or visual signals as to the guest as they near the parking space 24.

Service: Space Renting

Figure 14:
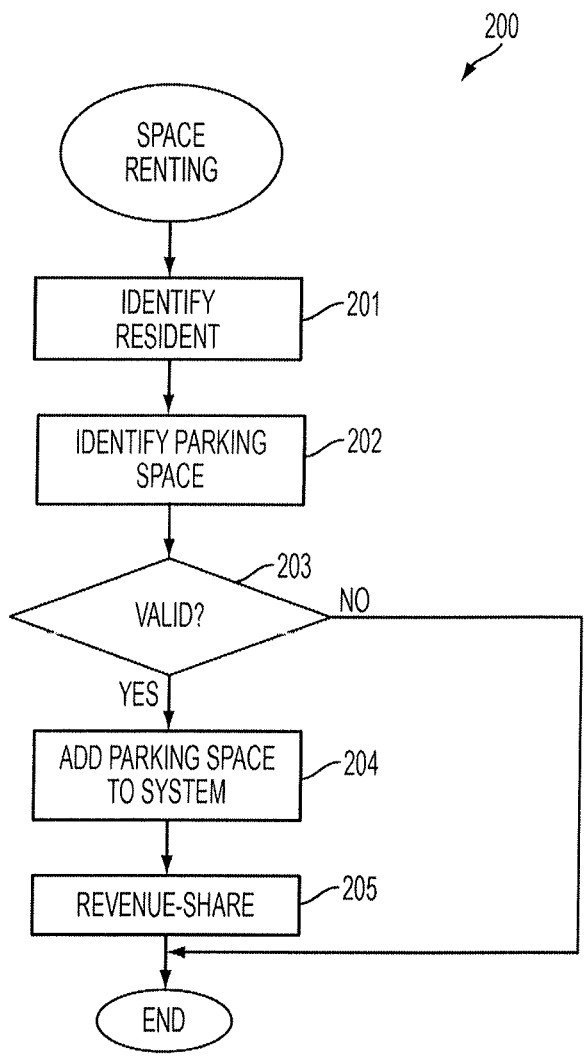
FIG. 14 is a flow diagram showing a routine for a space renting service for use in the parking services of FIG. 1.

At times, potential parking spaces 24 remain unavailable in urban settings simply for lack of an easy way to indicate the times when those parking spaces 24 could be used by drivers. For example, driveways are ordinarily on private property and generally unavailable to people who do not know the owners or otherwise lack permission. Similarly, curb cuts where driveways meet the street are generally unavailable for parking. Moreover, small businesses often have parking lots, which they do not use outside of regular business hours. The "space renting" service enables individuals holding rights to parking spaces 24, such as landlords or urban residents, to make those parking spaces 24 available for public parking during periods that they specify. FIG. 14 is a flow diagram showing a routine for a space renting service 200 for use in the parking services 12 of FIG. 1. Preliminarily, if not already present, the city or municipality places a parking device 21 or parking services kiosk 19 near the parking space 24 at the resident's house. The parking services 12 then associates the parking device 21 or parking services kiosk 19 with a controlling parking account. The system enables the resident to make the curb-cut parking space 24 available for renting on some days, and unavailable on other days, depending upon his schedule. On an ongoing basis, the resident may have some days when he regularly rents the parking space 24 out, such as while away from home or at work. On other days, however, like on the weekends, the resident may be at home and need his own parking space 24 for his own use.

Residents or other individuals who control a rented parking space 24 are provided a permit by the parking services 12 that allows them to set constraints on the use of the parking space 24. For example, the residents could limit and change the hours of availability, prohibit the parking of oversized vehicles, motorcycles, trailers, taxicabs, and the like, or only allow certain classes of vehicles to park. Other types of permit uses and restrictions are possible.

Several processes are undertaken to facilitate space renting. In one process, the resident applies for a parking device 21 or parking services kiosk 19, which would need to be installed near the parking space 24 that the resident intends to offer for rental. In a second process, the local parking authorities add the parking device 21 or parking services kiosk 19 into the parking services 12. In a third process, the resident enters parking constraints, which indicate when the parking space 24 may be rented. In a fourth process, which occurs once the parking space 24 has been assimilated into the parking services 12, drivers can make reservations, check-in, or leave the parking space 24. At a high level, the parking services 12 first identify the resident or rights holder (step 201) and determines the identity of the parking space 24 being offered for rental (step 202). If the ability of the resident to rent the parking space 24 is valid (step 203), the parking space 24 is added to the set of parking spaces available through the parking services server (step 204). The service thus has the public good of using potential parking spaces 24 more effectively without the need to build more.

Revenues from motorists parking in these spaces could be shared with the residents or individuals who control the space (step 205). In one embodiment, the resident receives compensation on a periodic basis. The amount of compensation can depend upon the amount of revenue actually collected for the parking space 24, which can help guard against abusive rental practices, such as where a resident blacks out the most valued hours in expectation of receiving revenue for a parking space 24 that actually sees little use, thereby not actually contributing the space for public use.

Merchant Parking Services

Service: Validate Parking

Figure 15:
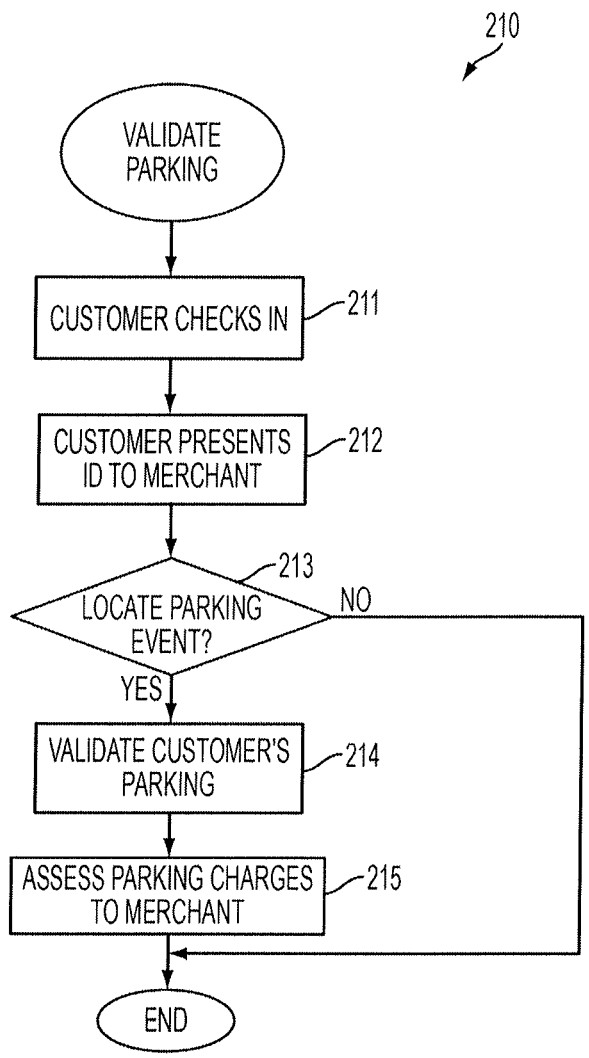
FIG. 15 is a flow diagram showing a routine for a validate parking service for use in the parking services of FIG. 1.

The validate parking service enables merchants to validate, that is, pay for parking for their customers. FIG. 15 is a flow diagram showing a routine for a validate parking service 210 for use in the parking services 12 of FIG. 1. One of the service's goals is to make parking transactions easier for both merchants and their customers by assisting with identifying the customer and the parking event.

Where the customer has already checked in to a parking space 24 (step 211), as described supra, the parking services 12 has already recorded the details of the parking event, including when and where the customer parked. When the customer provides identification to the merchant (step 212), the parking identification parking services 12 attempt to locate the parking event (step 213) and validate the parking (step 214). In a streamlined scenario, validation can take place automatically, such as when the customer makes a purchase with a credit card. When the customer provides the credit card at the point of sale, the merchant's point-of-sale terminal or similar system automatically checks the customer's identity into the parking services 12, which can then find the relevant parking event. Policies set by the merchant can determine how much credit is normally allotted for parking, which can possibly be contingent on the amount of sales to the customer. The validation switches parking charges from the customer to the merchant (step 215). In addition, the receipt given to the customer can contain a message thanking the customer for their business and telling them that their parking has been validated.

If the customer does not have a parking identity, or a temporary tourist parking permit, as described infra, the merchant could print a validation ticket or temporary credit or debit card that the customer could take to a parking device 21 or parking services kiosk 19 to carry out validation. The driver could also simply provide the unique identifier assigned to a parking device 21 to the merchant during validation.

Service: Parking Coupons

Figure 16:
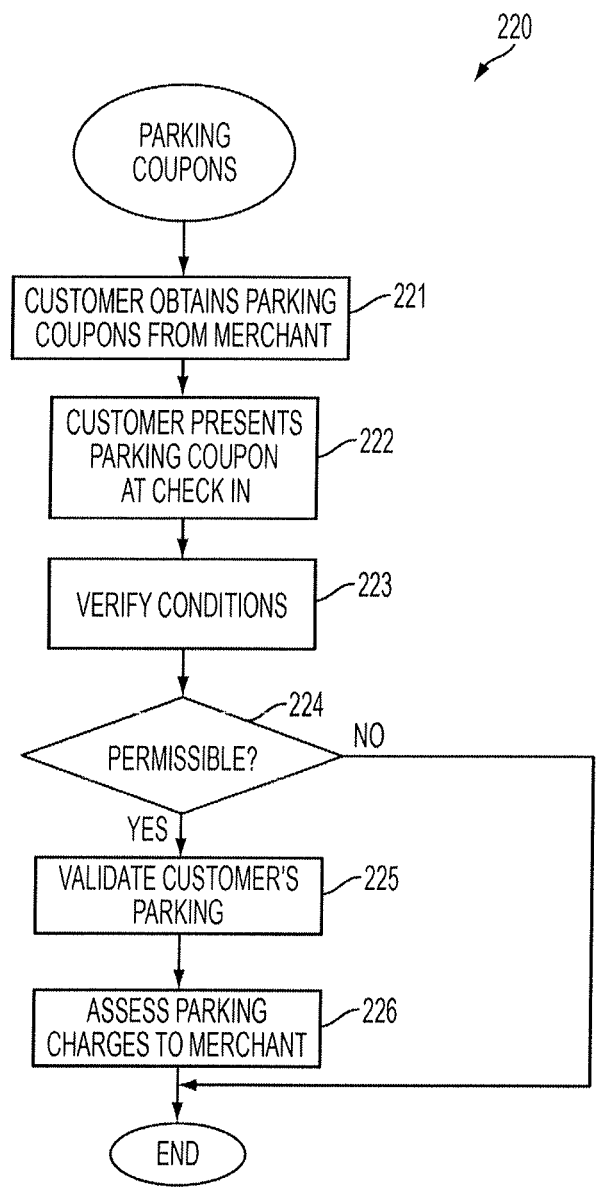
FIG. 16 is a flow diagram showing a routine for a parking coupons service for use in the parking services of FIG. 1.

Merchants may want to encourage potential customers to come to their store as part of a sale or other promotion event. FIG. 16 is a flow diagram showing a routine for a parking coupons service 220 for use in the parking services 12 of FIG. 1. One approach to facilitating merchant promotions is to enable the merchants to issue parking coupons, which customers can use at parking devices 21. These coupons could be given out at the store or included in advertisements in newspapers or magazines. The coupons could also be implemented as digital tickets or permits for use in mobile devices 15, 16, 17.

A customer would thus merely have to first obtain a parking coupon from the merchant (step 221), which is then presented at the parking device 21 or parking services kiosk 19 (step 222) when they park for free or discounted parking. Coupons could be limited to work only on certain days and times and only in parking spaces 24 in the vicinity of the issuing merchant's store and the parking services 12 would first verify that the conditions for parking are met (step 223). If the parking is permissible (step 224), the customer's parking is validated (step 225) and the merchant is assessed their portion of the parking charges (step 226). In a further embodiment, if the customer makes a purchase at the store, the merchant could use the parking coupon at the point-of-sale to upgrade a customer reward or to give the customer an additional discount.

Service: Customer Priority Parking

Figure 17:
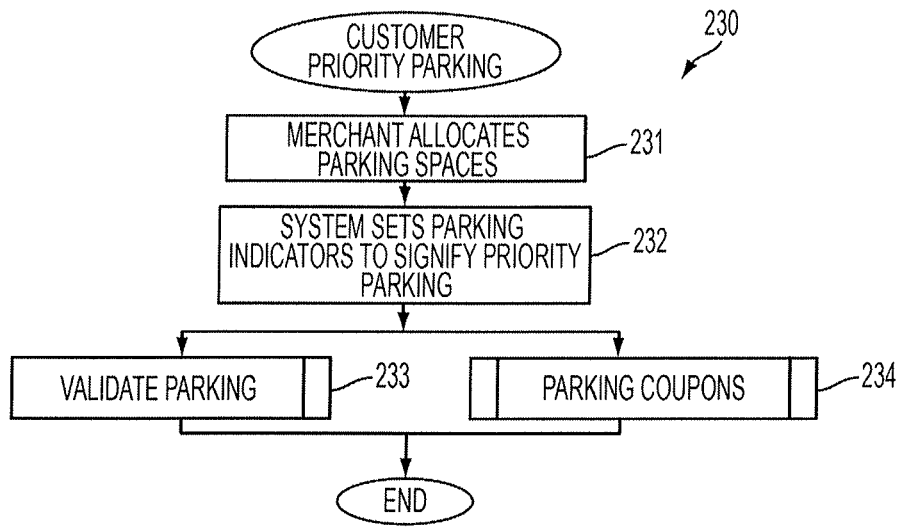
FIG. 17 is a flow diagram showing a routine for a customer priority parking service for use in the parking services of FIG. 1.

Merchants may want to provide priority parking for their customers on the day of a sale or at other times. For example, they may want to encourage customers by providing priority parking for them in front of their store. The customer priority parking service enables merchants to allocate these parking spaces for their customers during a specific period. FIG. 17 is a flow diagram showing a routine for a customer priority parking service 230 for use in the parking services 12 of FIG. 1. Parking is allocated to the merchant by the parking services 12 during the specified parking period (step 231). The parking indicators 23 proximate to the allotted parking spaces 24 are set to indicate the priority status of the parking spaces 24 (step 232). For example, the parking spaces 24 could flash green-and-blue indicators, accompanied by a short message displayed on the parking device 21.

When a customer parks in one of the designated parking spaces 24, the customer could either request parking validation (step 233) or present a parking coupon (step 234), as both described supra, to have their parking validated. Other drivers who park in the allotted parking spaces 24 during the specified parking period would not be able to get validations for parking unless they were also customers and could have increased fees charged for using those parking spaces 24 to help compensate the merchant's outlay.

In a further embodiment, merchants in a shopping district could join together in a promotion to develop district shopping awareness and subsidize parking during the promotion. The parking services 12 could give special discounts or other rewards if the drivers make purchases at multiple stores involved in the promotion.

Service: Merchant-Guided Policies

Merchants may sometimes find changing parking regulations temporarily to be helpful to business. For example, an ice cream shop may want to encourage rapid parking turnover in front of their shop. A merchant-guided parking service enables merchants purchase changes in regular parking constraints for parking spaces 24 in front of or near to their businesses. Some limits may apply. This service can be combined with customer-priority parking, as described supra, to more effectively control parking in front of or near a business by raising fees and shortening parking periods for non-customers.

Service: Tourist Privileges

Figure 18:
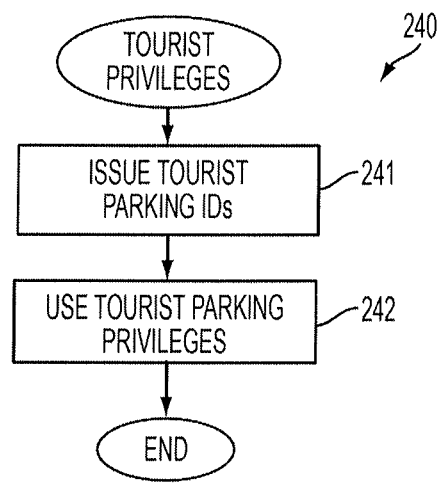
FIG. 18 is a flow diagram showing a routine for a tourist privileges service for use in the parking services of FIG. 1.

In various locales, business districts are sometimes provided specifically for catering to the needs of tourists. FIG. 18 is a flow diagram showing a routine for a tourist privileges service 240 for use in the parking services 12 of FIG. 1. The tourist privileges service includes two separate yet related processes. The first process involves the issuing of tourist parking identification cards (step 241). For example, a rental car agency may issue these cards to customers, who wish to conveniently run their curb-side parking charges through their rental car contract. The parking identification card may be offered by tourism bureaus, hotels, rental car companies, and the like. The ability to issue tourist parking identification cards could be governed by digital tickets or permit, as described supra. Agencies offering tourist benefits could begin to issue the tourist parking identification cards upon receiving the digital tickets or permits. These agencies would receive a stack of blank tourist parking identification cards. Using their digital tickets or permits, they would activate these cards. For tracking purposes, the agencies may be required to fill in information about the tourist, sales discounts, and so forth.

The second process involves using the tourist parking identification cards at check in (step 242). Merchants in business districts and tourism bureaus can also promote business and tourism by providing special parking help and privileges to tourists. In effect, a tourist with a parking identification card has a "special permit" that triggers various offers when checking into a parking space 24. Tourist privileges collectively combine services used by the merchants with services used by tourists and business travelers. Tourists can access privileges using a tourist-enabled parking identification card. Tourist privileges can be keyed to specific parking spaces 24 or throughout a tourism business district. Specific privileges for tourists include, for instance, the following benefits:

Extended Parking Limits. Parking limits may be extended for tourists to give them more time to shop and find their way around.

Reduced Parking Rates. Tourists may be offered reduced parking rates, subsidized by tourism bureaus, hotels, rental car companies, and the like.

Day Passes or All-Day Rates for Parking. Tourists could also be offered to day passes or all-day parking rates, along with transportation cards that could connect with other transportation services or be used with merchants for tourist discounts.

Other Discounts. Tourist parking identification cards could be presented to merchants to qualify for discounts in purchasing goods and services.

Additionally, when a vehicle driven by a tourist leaves a parking space 24, the parking services 12 could send the driver a courtesy notice that thanks him for using the parking service and provide a receipt. Additionally, the parking services 12 could send a notice that their car has left the parking space 24, which, for a tourist, may be an early notice that their car has been stolen or towed. The notice could also be provided as a service to all motorists and not just tourists.

Service: Advertising

In one embodiment, the parking devices 21 and parking services kiosks 19 include a display 26 (shown in FIG. 2) for presenting additional information. In a shopping district, for instance, these displays 26 could be used for advertising to promote local businesses. For example, during a sale, a display 26 could run an advertisement for the goods being offered on sale. The advertisements can include color and sound features, as well as directions for reaching the store from the parking device 21. In another example, near mealtime, a display 26 could feature an advertisement for food or drinks available at a nearby restaurant. An interactive advertisement, transacted through a combination of the display 26 and the user interface of the parking device 21, could enable a user to reserve a table at the restaurant.

Service: Scheduled Deliveries (Flexible Loading Zones)

Loading zones are often problematic in business districts. Local governments often resist allocating loading zones to preserve public parking, particularly as loading zones can tend to remain vacant during most of the day. Conversely, a scarcity of loading zones often seems to occur whenever several delivery vehicles arrive at the same time. Further, those same delivery vehicles often double park, causing congestion and other traffic problems.

Figure 19:
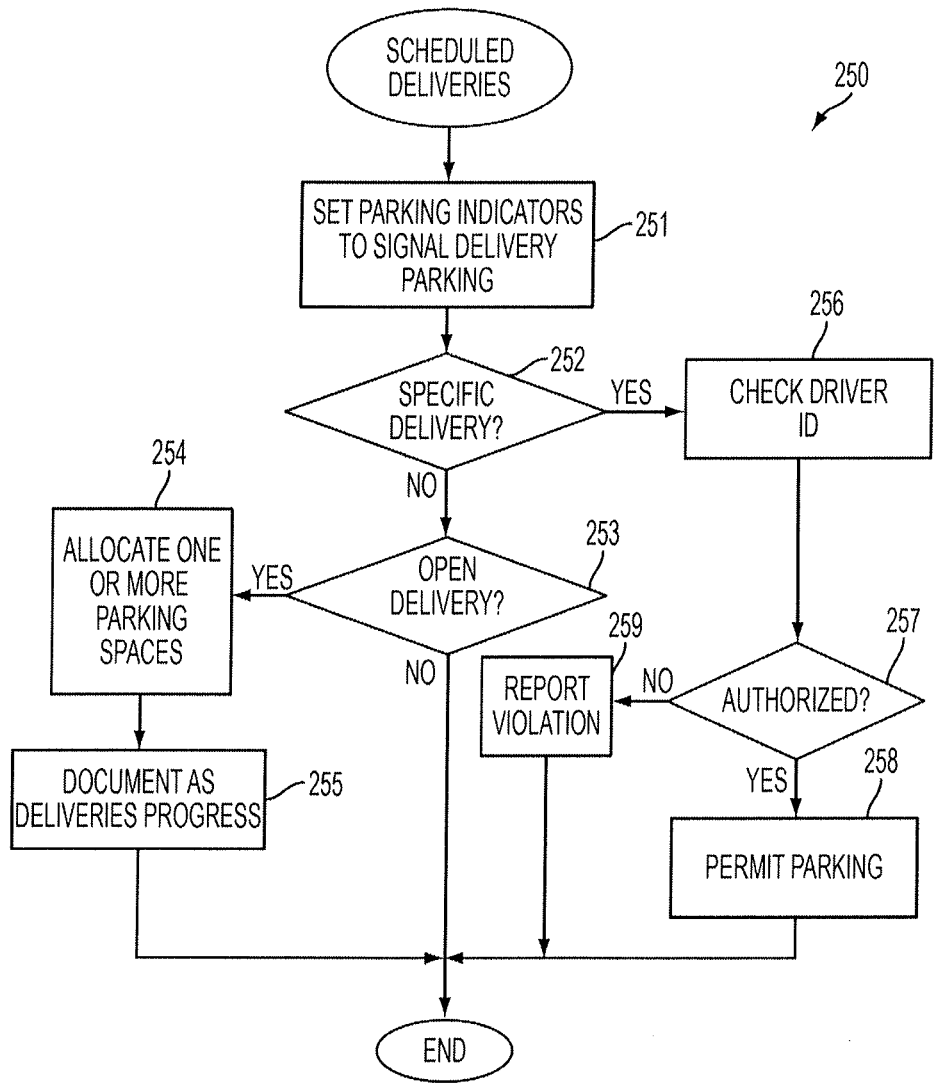
FIG. 19 is a flow diagram showing a routine for a scheduled deliveries service for use in the parking services of FIG. 1.

The parking services 12 can facilitate a more flexible way to arrange parking for scheduled deliveries. FIG. 19 is a flow diagram showing a routine for a scheduled deliveries service 250 for use in the parking services 12 of FIG. 1. The scheduled deliveries service enables merchants and delivery organizations to dynamically reserve parking for deliveries ahead of time. This approach allows the number of loading zones to flexibly grow and shrink according to need, thereby enabling smoother deliveries and providing more parking spaces 24 when deliveries are not scheduled.

The scheduled deliveries service includes two separate yet related processes. The first process involves allocating parking spaces 24 for delivery or loading zones. There are different ways to allocate parking spaces 24. For example, a loading zone can be set up through a reservation for a particular driver or can be reserved for anyone with a loading zone permit.

The second process involves check-in, where a driver checks in to a delivery or loading zone. Parking indicators 23 are set to signal the use of parking spaces 24 for deliveries (step 251). One approach is to simply use a red indicator for reserved parking spaces 24. Another approach is to use a combination of color indicators and signals to clearly mark a loading zone. For example, a parking indicator 23 could show a blue indicator, signaling that a permit is required, and also flash a yellow indicator, indicating that the space is available for only a short while.

Different arrangements for reserving parking spaces 24 for scheduled delivery can be provided. For example, flexible loading zones include:

Specific Delivery (step 252). A specific parking space 24 is reserved for a particular delivery. The parking identity of the driver of the delivery vehicle is verified at check (step 256). Only authorized parking identities (step 257) enable permissible parking in the loading zone (step 258). Unauthorized use of the loading zone parking space 24 can trigger guided enforcement, as further described infra, and could include automatic reporting of parking violations (step 259).

Open Delivery (step 253). One or more parking spaces 24 are allocated for delivery during a set period (step 254). The parking spaces 24 are available for any authorized delivery during the period. The number of parking spaces allocated can be decreased (step 255) as deliveries are completed.

Service: Valet Parking

Some merchants wish to develop a high sense of customer service by providing enhanced parking services to their customers. For example, they may wish to provide convenient access to substantial parking within a fixed distance from their establishment to their customers. Suitable parking facilities, however, are not always available in urban settings. Alternatively, merchants provide valet parking service to customers, thereby freeing their customers from the hassles and inconvenience of self-parking.

Parking Pre-Reserved for Valet Services

Figure 20:
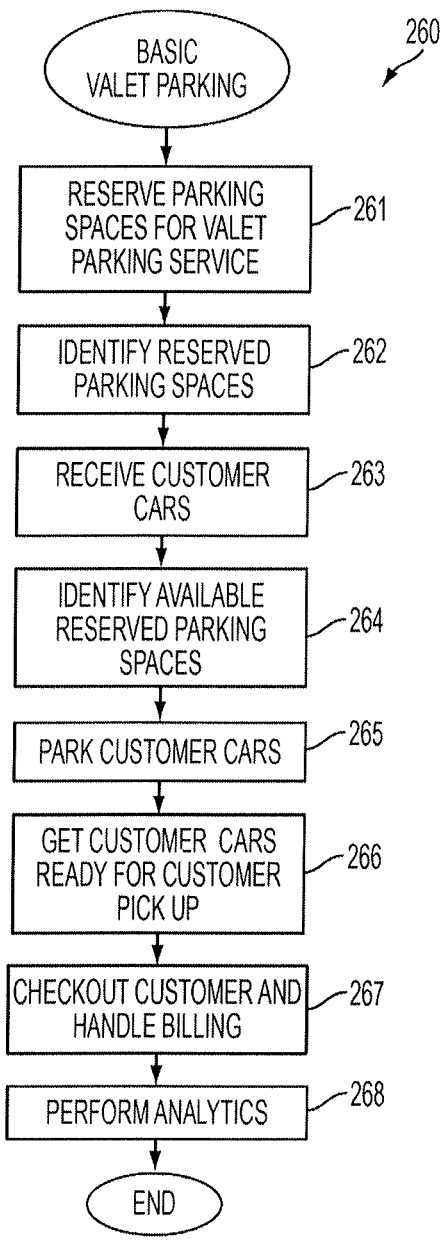
FIG. 20 is a flow diagram showing a routine for a basic valet parking service for use in the parking services of FIG. 1.

Typically, valet parking might be provided by an organization or group for a special one-time occasion or event, such as a wedding, funeral, or black tie gala, or on a regular or periodic basis by a local business or other on-going concern, such as a restaurant, bar, retail store, or airport. In one embodiment, the merchants use pre-reserved public parking spaces 24 to support the valet parking services provided for their customers' convenience. FIG. 20 is a flow diagram showing a routine for a valet parking service 260 for use in the parking services 12 of FIG. 1. There are several prerequisites to providing a valet parking service. First, each service must have a permit or similar form of permission from the city or municipality that allows the service to reserve parking spaces 24 for valet parking purposes. The permission also enables use of their special valet parking identification cards and allows the service to maintain an inventory of valet parking service-usable parking spaces 24, as well as potentially making available online valet parking support. The valet parking service includes the "Check-In" and the "Find My Car" services, respectively described supra with reference to FIGS. 6 and 11. However, these two services are tuned to work with each registered valet's identification card. In one embodiment, each valet has a stack of such identification cards, which can each be associated with a customer's car.

In this form of parking service, a valet parking company, a merchant, or some type of sponsoring party arranges to reserve several parking spaces 24 near a designated location (step 261), generally adjacent to their establishment or event, for valet parking of customers' vehicles. The valet parking reservation could be for a fixed period that runs out when the reserved time expires, but can be automatically renewed or set up to run periodically or based on a schedule. Alternatively, the valet parking reservation could be open-ended. The merchant, who could be representing a restaurant, hotel, special event, and so on, registers one or more parking spaces 24 with the parking services 12 to be used for valet parking Businesses sometimes employ their own staff of valets or contract with a valet parking service. Through the show parking availability service 50, the parking indicator 23 at each of the reserved parking spaces 24 identifies the parking space 24 as not available for parking by the general public (step 262). The merchant provides the valets with the locations of these pre-reserved parking spaces 24, which the valets use to park customers' vehicles.

Typically, valet employees greet customers and receive their cars for parking (step 263). A valet pickup location may be designated, which is where customers drop off and pick up their cars with the valet parking service. Generally, the valet pickup location is close by the business that is sponsoring the event, although a floating or on-request pickup location could also be arranged with prior customer notice, as further described below. In a further embodiment, a parking space 24 can be designated as the valet pickup location. The vehicle sensor 22 detects that a vehicle has parked in the parking space 24 and a valet is notified by a message or other notification sent via the parking services 12.

With the assistance of the parking services 12, available reserved parking spaces 24 can be identified to each valet (step 264). In the customary fashion of valet parking, the customer permits the valet to park his car (step 265) and hold onto the car's ignition keys, or other means for entering and starting the vehicle, until he returns. Generally, the ignition keys are kept in a secure storage. Although described herein with reference to conventional car ignition keys, other types of car access and ignition switching devices are contemplated, including codes for keyless entry systems that use door-mounted keypads and hands free ignition systems that allows a driver to start a car's engine if seated in the driver's seat and in possession of a wireless ignition transponder. Accordingly, "car keys" or "ignition keys" will be understood to apply to all manner of means for entering and starting a vehicle that could be left in the custody of a parking valet or other approved individual. By way of example, such car keys include traditional metal blade-type keys with teeth or similar features provided on the edge of each blade, transistorized and electronic keys, limited-use keys, such as "valet" keys that start the ignition and open the driver's door only, code immobilizer and infrared keys, access codes, and remote keyless entry fobs. Other forms of car or ignition keys are possible.

Upon completion of business, a valet can get customers' cars ready for pick up (step 266), provided the valet knows when the customer is likely to return, by retrieving the ignition keys from the secure storage and retrieving their car, although other arrangements for post-valet parking car retrieval are possible, such as pre-positioning a customer's car in a parking space 24 closer to the place of pick up, as further described below. At some point during the valet parking process, the valet checks out the customer and handles any billing through the parking services 12 (step 267). The check out might be as simple as notating that the customer has picked up his car and left, or could require transacting the purchase of the valet parking services. Finally, the valet parking service can perform analytics (step 268) on the overall use of the service by retrieving and evaluating the customer parking data stored by the parking services 12.

Vehicle Location Tracking

Figure 21A:
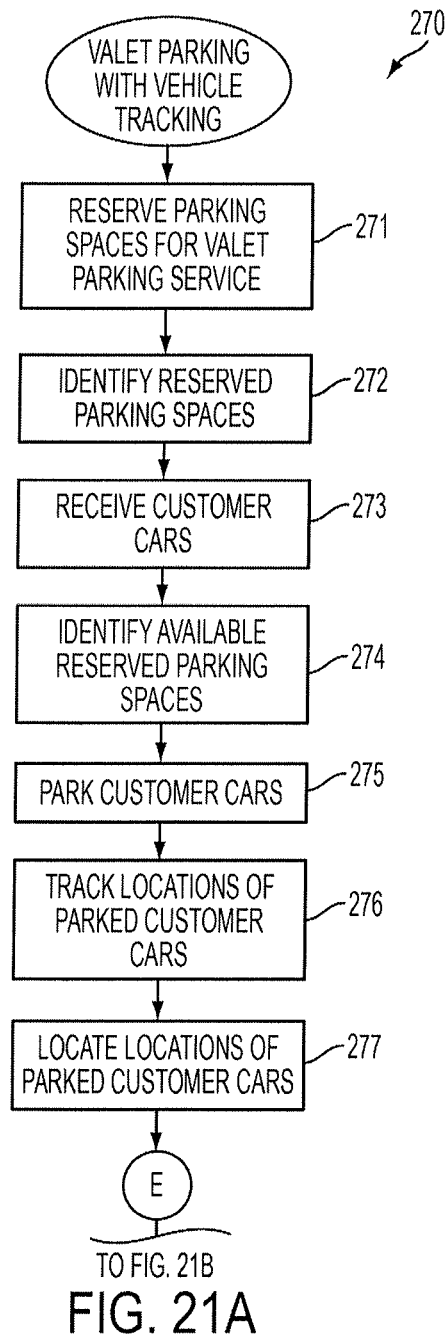
FIGS. 21A-21B are flow diagrams showing a routine for a valet parking service with vehicle location tracking for use in the parking services of FIG. 1 in accordance with a further embodiment.
Figure 21B:
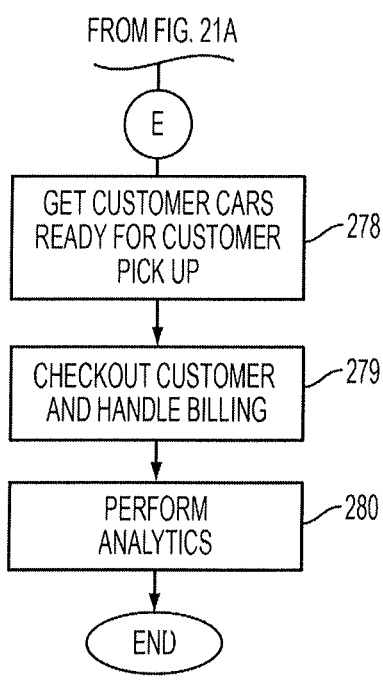

In basic form, the valet parking service uses the parking services 12 to simply enable the merchant to use the parking spaces 24 for a valet purpose. The parking services 12 keeps the parking spaces 24 available exclusively to the valets and does not ordinarily track where the valets are parking particular cars. To facilitate valet parking, particularly where the reserved parking spaces are located out of the line-of-sight of the valet attendants' station, the parking services 12 can keep track of where particular each car is located, instead of only keeping the parking spaces reserved for the valet service. FIG. 21 is a flow diagram showing a routine for a valet parking service with vehicle location tracking 270 for use in the parking services 12 of FIG. 1 in accordance with a further embodiment. As with basic valet parking, a set of parking spaces is reserved (step 271) and reserved parking spaces are identified through their respective parking indicators 23 (step 272). Valet employees greet customers and receive their cars for parking (step 273). With the assistance of the parking services 12, available reserved parking spaces 24 are identified to each valet (step 274) and each customer has a valet park his car (step 275). Additionally, the valet uses the parking services 12 to keep track the locations of their customers' cars (step 276). For example, the valet parking attendants could be issued parking identification cards to swipe through the nearest parking device 21 or parking services kiosk 19 upon which they could notate their customers' identification and vehicle information, thereby allowing the parking services 12 to track the location at which a particular vehicle is parked.

As the parking services 12 keeps track of where the valets are parking the customer's cars, the valets could later use a variation of the "Find My Car" service, as described supra, to locate the valet-reserved parking spaces for the vehicles that they have parked for their customers (step 277). Different levels of valet parking service can be provided along the theme of "how does the valet indicate which car is parked where?" as described infra.

Various additional services can be used to support valet parking services. For example, the parking services 12 could provide a "valet customer check-in" service. This service could enable the valet to collect information about the customer, which would include identification and contact information, such as a credit card number and telephone number. In addition, the collected customer information could include an estimate by the customer about when they expect to return for their vehicle.

In support of the valet, the system can find an available parking space 24. When a valet parks a car, he swipes the parking identification card that he assigned to that car, so that the system knows which car is parked in what parking space 24. The system could also keep a correspondence between a customer's credit card or other form of identification that provides, for instance, the customer's name, and a parking identification card to help identify a car when a customer returns. When a parked car is moved from its parking space 24, the parking indicator 23 maintained by the parking services 12 would continue to show that the parking space 24 is reserved for valet service, but that the parking space 24 is not currently occupied. Further, the valet parking service could also set up a designated "valet drop-off" parking space 24. When a car is parked in that space, the system could automatically summon a valet, who is notified that there is a car that needs to be parked. Cars could also be returned to the "valet drop-off" parking space 24 for customer pickup, or another parking space 24 could be designated for valet pick-up.

Upon completion of business, a valet ordinarily gets each customer's car ready for pick up (step 278), although other arrangements for post-valet parking car retrieval are possible, as further described below. At some point during the valet parking process, the valet checks out the customer and handles any billing through the parking services 12 (step 279).

Various additional online services can also be used. For example, when a valet has a new vehicle to park, the parking services 12 can automatically suggest an unoccupied parking space 24 for the vehicle. If the system knows the expected return times of valet patrons, the system could also help the valets get the cars ready for the patrons by suggesting to the valets to move cars to convenient locations ahead of a patron's expected return. Similarly, when cars are moved in or out of valet parking spaces 24, the parking services 12 help valets keep track of what parking spaces 24 are still available and what cars still need to be picked up. The system could provide these suggestions and assistance through various displays or by sending messages to the valets.

Finally, the system can provide analytics or reports (step 280) about the valet parking for a night or event, including occupancy by hour, the particular comings and goings of valet-parked cars, the particular cars parked by various valets, and so forth.

Distributed On-Street Valets

Motorists who use valet parking services generally expect valets to be found in certain places, most generally nearby the entrance to a business, which they seek to patronize, such as at curbside in front of a restaurant or at other customary or designated valet drop off locations. The practice of locating valets close by a business both minimizes the distance that a motorist has to walk to the business, perhaps only a few steps, which is helpful in rainy weather or when wearing high heels or dressy garments, and increases the business' clientele, particularly where a lack of convenient parking would otherwise discourage or prevent customers from stopping by.

Valet parking, however, need not always be associated with a particular business' front entrance or limited to a special occasion. Instead, valets could be stationed throughout an urban environment or anywhere parking is needed to provide convenient parking services, so long as motorists know beforehand where or how to find them. Advances in mobile communications and on-board navigation and "infotainment" systems are increasingly enabling motorists to stay in touch with other people and concerns, even while in transit. Arranging a curbside valet rendezvous no longer needs to be a carefully orchestrated event that requires advanced planning and which accounts for contingencies, such as traffic delay, as the motorist can now simply call ahead and update the receiving party if unforeseen circumstances necessitate a cancellation or sudden change in plans.

Figure 22A:
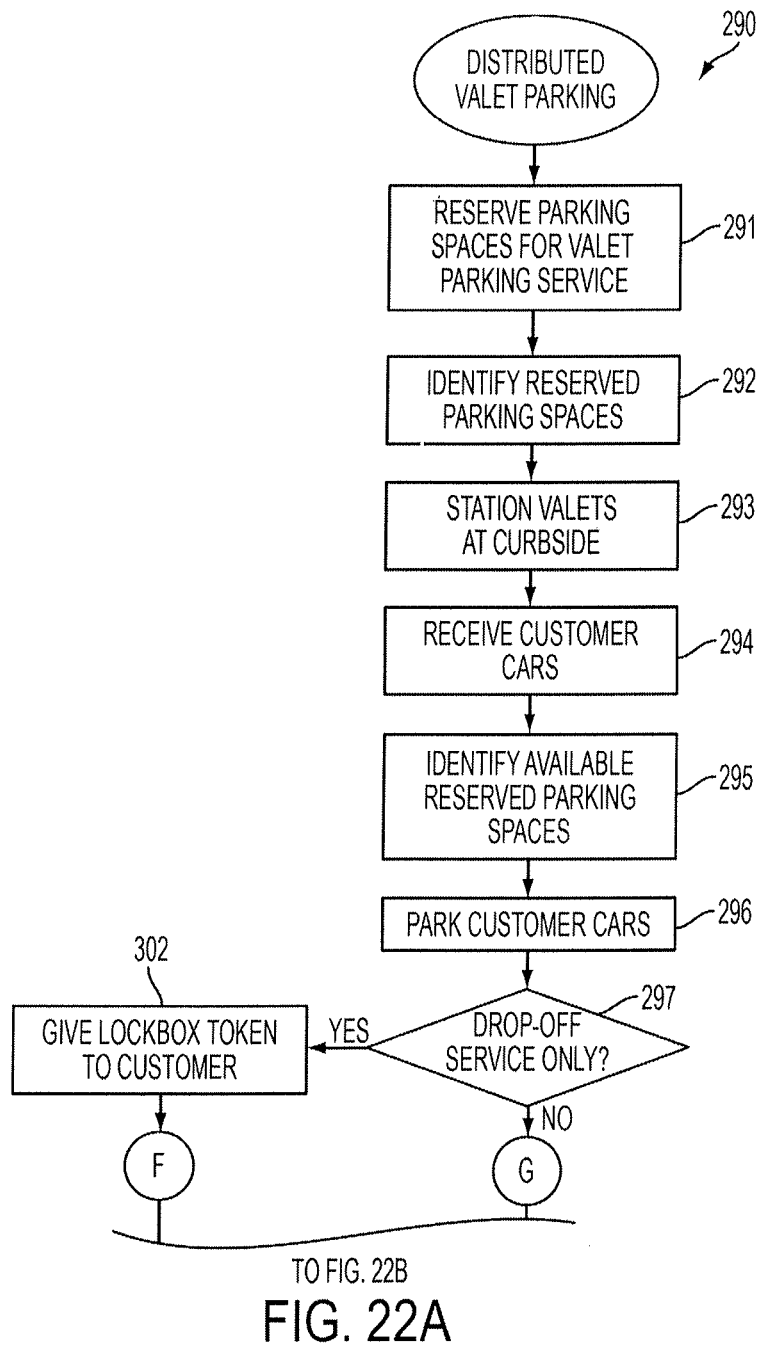
FIGS. 22A-22B are flow diagrams showing a routine for a distributed on-street valet parking service for use in the parking services of FIG. 1 in accordance with a further embodiment.
Figure 22B:
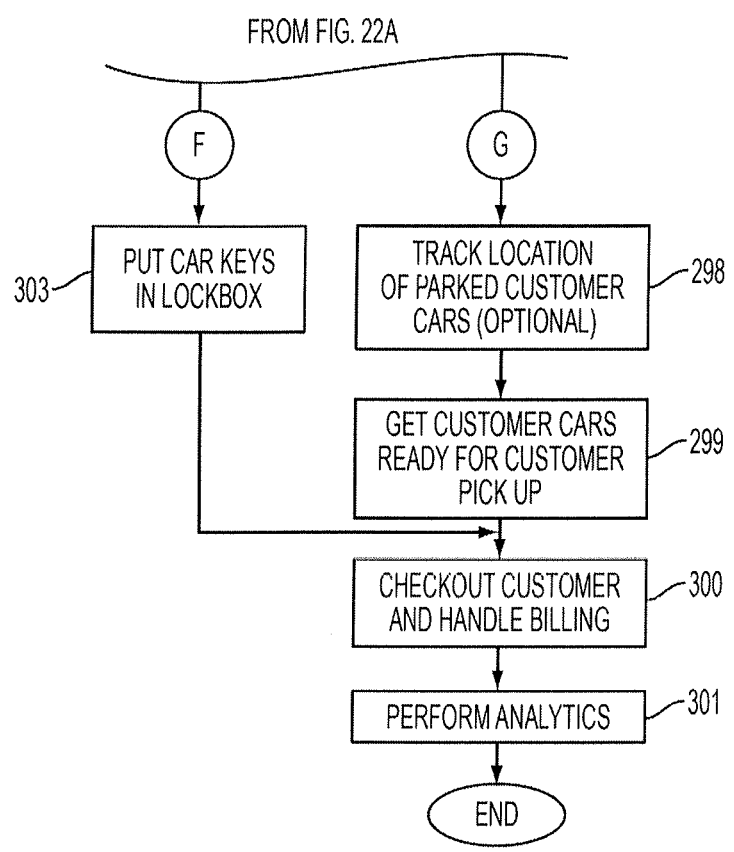

Distributed on-street valet parking services could be provided by distributing valets throughout an urban area or wherever parking is needed. FIG. 22 is a flow diagram showing a routine for a distributed on-street valet parking service 290 for use in the parking services 12 of FIG. 1 in accordance with a further embodiment. As with basic valet parking, a set of parking spaces is reserved (step 291) and reserved parking spaces are identified through their respective parking indicators 23 (step 292). Valets are stationed at curbside, on the street, or at other convenient or pre-arranged locations (step 293). A motorist will meet one of the valets (step 294) and, with the assistance of the parking services 12, the valet would then find a reserved parking space 24 for each customer's vehicle (step 295) and park his car (step 296). This approach reduces the uncertainty of finding a parking spot because the burden is offloaded to the valet. Moreover, the risk to a valet of a customer delay or no-show and inefficiencies due to time wasted waiting for a customer are counterbalanced by the valet's ability to contact a customer in their car.

Distributed valet parking helps motorists ensure their cars are actually parked without worrying over a scofflaw stealing their reserved parking space at an inopportune time. Parking spaces reserved by motorists through an on-line street reservation system still remain exposed to non-participating drivers who may choose to "poach" the parking spaces, which have been legitimately reserved by others, thereby upsetting the balance and expectation of having a reserved spot. The valets could be located on-street or in other locations either pre-designated or arranged in advance, thereby enabling the valets to be found by prospective customers. For instance, a motorist could arrange a rendezvous with a valet in an alleyway that would allow safe unloading of passengers and cargo, rather than on a particularly busy street without authorized curbside access.

If the distributed valet service is for both drop-off and pick-up (step 297), the valet can optionally use the parking services 12 to keep track of the locations of their customers' cars (step 298). Upon completion of business, a valet ordinarily gets each customer's car ready for pick up (step 299), although other arrangements for post-valet parking car retrieval are possible, as further described above. At some point during the valet parking process, the valet checks out the customer and handles any billing through the parking services 12 (step 300). Post-valet parking service analytics can also be performed (step 301).

In a still further embodiment, the distributed valet service can be structured for drop-off only (step 297). Upon receiving a car for parking, the valet would give the motorist a token to unlock a lockbox (step 302) that is located close to where the driver dropped off the car. The token would enable the motorist to retrieve his car keys from the lockbox upon return. Upon parking the customer's car, the valet would place the car keys in the lockbox (step 303), along with a printed map or other directions of where to find the parking space for the car. This approach would entail fewer valets and no waiting time for drivers to retrieve their cars.

Additionally, motorists would not need to have a smart phone or other way to communicate with the valets in case they were running late to pick up their vehicle. Notwithstanding, where mobile communications with valets are available, for instance, more sophisticated drivers could make a reservation with a valet through their mobile phone and guarantee that the valet would be waiting for their vehicle drop-off. A driver might also request that the valet find a parking space close to the driver's ultimate destination, rather than at the valet's particular drop-off point or customary curbside station. Later, the driver could be notified by the valet through his mobile phone of the parking location of the driver's car. Provided the driver had a second key with him, the driver could retrieve their car first and then drive back to the valet station to retrieve the first car key from the valet or lockbox, rather than first retrieving the key and walking back to his car. Other forms of distributed valet parking services are possible.

Valet Parking Service Levels

By way of example, the valet parking service levels can include:

"Find My Car." Each valet maintains a stack of parking identification cards that each have a uniquely assigned identifier, either printed on the face of the card, electronically embedded into the card, or otherwise integrated into or associated with the card. A parking identification card is paired with each set of car keys. When a valet parks a customer's car, the valet registers the parking identification card with the nearest parking device 21 or parking services kiosk 19, which causes the parking services 12 to record the location of the parking device 21 or parking services kiosk 19 in association with the parking identification card. Later, upon customer request, the valet uses the "Find My Car" service, as described supra, to locate that customer's car based on the parking identification card that is paired with the requesting customer's car keys. The "Find My Car" service then generates a map and directions to the parking space where the customer's car is parked.

Paper Tickets. A paper ticket with a printed parking identifier is assigned to each customer's set of car keys. When a valet parks a customer's car, the valet swipes or registers the paper ticket through a card reader or other input device integrated into the user interface of the nearest parking device 21 or parking services kiosk 19 and requests a valet event number. The valet event number is presented on the display 25 and is written on the paper ticket. Alternatively, the parking device 21 or parking services kiosk 19 could print the valet event number directly on the paper ticket. Later, the valet enters the event number into the parking services 12 and asks for the location of the car in a manner analogous to the "Find My Car" service, described supra.

Vehicle-Centric Identification. When a valet parks a customer's vehicle in a pre-reserved valet parking space, the parking services 12 uses an identifier that is uniquely associated with each vehicle, such as an RFID tag, parking placard, or the vehicle license plate or vehicle identification number (VIN), to record the location of the vehicle. Later the valet uses the owner's identity or the vehicle's identifier to locate the parking location of the car.

Valet Identification. Each valet is issued a parking identification card. When a valet parks a customer's car, the valet uses his own parking identification card and the parking services 12 creates a record of where the car is parked, associated with the time of parking and the valet's parking identification. This information is either printed out or transmitted into a handheld device that the valet carries, such as a mobile device 15, 16, 17, for later print out. The valet attaches the printed information to the customer's car keys, which can be used to query the parking services 12 for the parking location of the car.

Service: Special Use Reservations

Parking spaces 24 are sometimes used by communities for purposes other than parking. For example, parking spaces 24 may be used temporarily as a staging area in a construction zone. Similarly, restaurants may find moving tables or other outside activities into the street to be beneficial, such as during late summertime evenings. As well, business districts may want to reserve a block of parking spaces 24 for a special event that flows into the street. The parking services 12 include a special use reservations service to enable communities, merchants, and others to reserve parking spaces for special use purposes.

Parking Authority Parking Services

Service: Guided Enforcement

Figure 23:
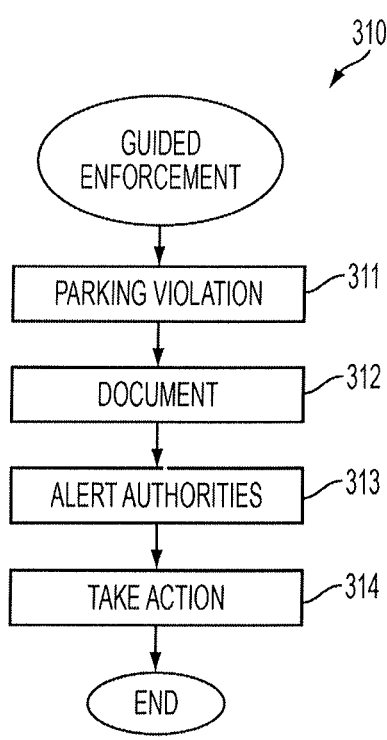
FIG. 23 is a flow diagram showing a routine for a guided enforcement service for use in the parking services of FIG. 1.

The parking services 12 maintain the locations of each vehicle parked in a parking space 24 under its control and is able to determine compliance with applicable parking regulations and time constraints, both facets of which can be helpful to parking enforcement officials. FIG. 23 is a flow diagram showing a routine for a guided enforcement service 310 for use in the parking services 12 of FIG. 1. Parking violations can automatically be determined (step 311) and documented (step 312) by the parking services 12 through examination of the sensor data 40 and device data 41 continually provided respectively through the sensors 22 and parking devices 21. Parking authorities can be alerted as the parking violations (step 313) and provided photographs and other parking violation indicia. Where permitted, the parking services 12 could even take action (step 314), such as issuing parking violation citations, summoning a tow truck, or take other action. For instance, in lieu of towing a car, a vehicle immobilizer or parking "boot" could be placed on the offending vehicle by parking authorities to render the vehicle undriveable. The parking device 21 or parking services kiosk 19 can display instructions to the driver, who can call in or go online to pay a parking fine. He will then receive a security code that allows him to remove the boot for later drop off at a collection point. Whether to immobilize or tow depends on the scarcity of parking spaces and other factors.

Service: Schedule Street Event

Figure 24:
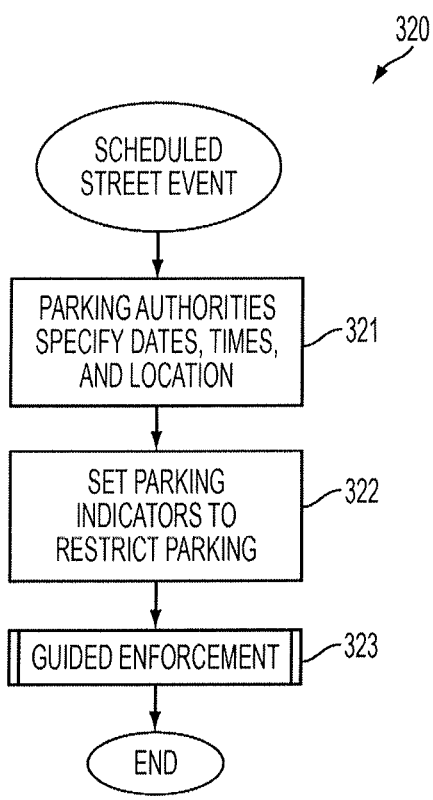
FIG. 24 is a flow diagram showing a routine for a schedule street event service for use in the parking services of FIG. 1.

Similar to special uses undertaken by businesses, as described supra, communities sometime schedule events that require street closure. FIG. 24 is a flow diagram showing a routine for a schedule street event service 320 for use in the parking services 12 of FIG. 1. Street event parking can be arranged ahead of time. Parking authorities can enter the dates and times for these events into the parking services 12 (step 321). The parking services 12 log the time and identifies the parking devices 21 and parking services kiosks 19 affected. When time for the street event arrives, the parking indicators 23 are set to restrict parking on the street (step 322), rather than having to have parking control officers place signs or cover parking meters manually.

During the duration of the street event, the parking services 12 handle situations where a vehicle attempts to parks in a reserved parking space 24. If free parking is provided to motorist as part of the street event, parking services 12 ignores the parking space 24. As well, the sensors 22 may also detect other non-parking activities, such as activations due to vending carts, foot traffic, and the like. These non-parking activities can also be ignored. The time period during which the parking services 12 ignore such parking events can be set at the time that the street event is scheduled, or at any time later by the parking account 37a-c for the event. Additionally, the parking services 12 allow authorized individuals, such as event organizers, to access a parking device 21 or parking services kiosk 19, use an authorized street event parking identification card, and report a parking violation if they want a vehicle removed from one of their street event parking spaces 24.

The parking services 12 automatically reset the parking indicators 23 after the street event is over. Additionally, the parking services 12 can undertake guided enforcement (step 323), as described supra, to ensure the event commencement.

Service: Manage Street Sweeping

Street sweeping services are provided in many urban settings. Typically, the hours of street sweeping are posted and vehicles can be fined if they are parked on a street during the posted period. Several useful variations on managing street sweeping of benefit to both the municipality undertaking street sweeping and motorists who live on streets subject to sweeping can be provided by the aforementioned suite of parking services.

For instance, parking spaces could be more completely utilized if the parking system kept track of when street sweeping is finished for individual city blocks. Conventionally, no vehicles can be parked in parking spaces on streets subject to sweeping during the entire period when street sweeping is scheduled, even if sweeping has been completed on a particular street before the expiry of the period. Using the networked parking services, the parking spaces could be made available for parking sooner once the sweeping of a city block is complete. The notification of sweeping completion could be made by a street sweeping vehicle equipped with, for instance, a GPS locational device and communications equipment capable of remotely interfacing the vehicle to the parking services servers 12 or other gateway into the parking services network.

Residents could also be allowed to remain parked through a street-sweeping cycle. For instance, an urban resident may need to park on the street while away on vacation, even during those times when street sweeping is ordinarily scheduled. In this situation, the resident would pay a penalty for parking during the sweeping period ahead of time, essentially reserving the parking space, albeit at a higher rate, or by using special permit obtained in advance of the needed time period. The municipality would collect the fee from the resident without logging a parking violation, thereby helping offset higher-cost manual street cleaning around the resident's parked vehicle as needed.

Finally, motorists could be provided an alert service if their cars are parked at the wrong time in a street sweeping zone. These motorists could be alerted by automated text message, telephone call, or other means in time for them to move their vehicles and allow street sweeping to proceed as scheduled.

Examples of the Parking Services Server in Action

Friendly On-street Parking Services for Shoppers and Merchants

When convenient parking for a store or shopping district is unavailable or unpredictable, shoppers are discouraged from going out. Furthermore, merchants have no direct way to encourage people to drive to their stores, such as by easily validating on-street parking. As well, tourism bureaus have no way to promote access for visitors by simplifying on-street parking or by giving visitors preferential treatment in parking or violation handling.

The time needed to complete everyday errands is often variable and the time required to find parking in a business district depends upon traffic and the level of parking occupancy. After parking, people may browse, shop, run errands, or dine, all of which require a variable amount of time. With fixed time periods for parking, these people need to return to parking meters to pay for additional parking time before the meter expires, or they must move their cars when the time limit for parking in one particular parking space has been reached.

These parking situations are bad for business. When shoppers need to return to their cars, they may decide to simply leave and skip further retail purchases. People who value their time have no way to translate their needs and level of urgency into increased on-street parking availability or predictability. Merchants also lack the means to incentivize people to come to their district, or to modify parking policies in ways that promote business for themselves or their business district.

The real-time and account-based parking services provided through the parking services 12 and a network of smart parking devices 21 address the needs of these individuals. In a typical scenario, a driver can check that a parking space 24 is available and can then simply park his vehicle. A sensor 22 detects that the parking space 24 is now occupied and prompts the driver to check in and provide a parking identity for the parking event. The driver may swipe a parking identification card, credit card, or other form of identification at the parking device 21, thereby enabling the parking services 12 to determine the driver's identity, validate any required parking privileges, and log the parking event. Later, the driver might make purchases at a local store. By using the customer's parking identity, the parking services 12 can identify the current parking event, log a parking validation for the customer, and cover the customer's parking charges for a period.

Additionally, merchants, civic groups, and other similar interests could obtain special permits or specialized accounts for interacting with the parking services 12. In addition to providing validation of customer parking, merchants can reserve also parking spaces 24 in front of their stores for scheduled deliveries, thus reducing the congestion-inducing practice of double-parking to unload goods.

Residential Parking Services

In urban neighborhoods, residents sometimes lack garages and have to park on the street at night. They also sometimes have parking needs during the day. In neighborhoods with conventional coin-fed parking meters, residents spending the day at home are forced to continually feed coins to the parking meter or move their car, which can be inconvenient and frustrating.

The parking services provided through the parking services 12 and a network of smart parking devices 21 also address the needs of these individuals. Urban residents can reserve on-street parking spaces 24 near their home for overnight or daytime parking. The policies enforced for signing up for parking services may give preferred treatment according to various criteria, such as residential address, level of parking utilization on the street, and according to any permits possessed by the resident, such as for handicapped parking.

The parking indicators 23 tell drivers when a parking space 24 is available. When someone pulls into a reserved parking space 24, a nearby parking device 21 provides a visual or audio reminder to check in. The driver provides his parking identity by swiping a parking identification card or other identifying data. In a further embodiment, a transponder or similar device can automatically retrieve an RFID tag or other wireless identifier from the vehicle, or a camera integrated into the parking device 21 could read the vehicle's license plate. When a vehicle parks in a reserved parking space, the parking device 21 can issue a warning that the parking space 24 is reserved. If an unauthorized driver tries to check in for parking in a parking space 24 reserved for someone else, the parking services 12 can refuse payment and deny parking.

Additionally, the parking services 12 can alert parking enforcement resources about parking violations, thereby taking the urban resident out of the loop of satisfying his parking reservation. If the unauthorized driver does not remove his vehicle within a state time, the parking services 12 could, for instance, summon a parking enforcement officer to issue a ticket and a tow truck to remove the offending vehicle. The parking device 21, as well as surrounding parking devices 21, could also take pictures to document the parking violation. Where the parking services 12 know the identification of the driver, photographic evidence generated through the parking device 21 could support issuance of a traffic citation.

In addition, the parking services 12 can alert drivers if they are at risk of a parking violation. For example, drivers could receive timely alerts if a street cleaning time is approaching and they have left their car in an affected parking space 24 under control of the parking services 12. In another example, drivers could be alerted if their parking time is almost expired where a time limit applies or when another driver has previously reserved the parking space 24. Likewise, drivers occasionally forget where they parked. Since the parking services 12 has global knowledge of all cars parked in controlled parking spaces 24, drivers could use the "Find My Car" service at any parking device 21 or parking services kiosk 19 to locate their car.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing distributed on-street valet parking with the aid of a digital computer, comprising:
   a server configured to manage a multiplicity of motor vehicle parking spaces disbursed over a plurality of physically-separate and openly-disbursed parking locations, the server configured to interface over a computer network and comprising a memory and a computer processor, the computer processor operatively coupled to the memory and configured to execute computer executable program modules;
   a plurality of smart parking devices that are each located proximate to and which correspond to at least one of the parking spaces, each of the smart parking devices interfaced with the server via the computer network;
   a plurality of vehicle occupancy sensors that are also each located proximate to and which correspond to least one of the parking spaces, each of the vehicle occupancy sensors interfaced with the server via the computer network;
   a plurality of parking availability indicators that are each associated with each one of the parking spaces, each of the parking availability indicators interfaced with the server via the computer network, each of the parking availability indicators comprising a plurality of indications that correspond to an availability of each of the associated parking spaces for parking based upon actual, reserved and restricted use of the parking space;
   a reservations module executed by the server and configured to reserve through the server use of a plurality of the parking spaces for a valet service, comprising:
      a request module configured to accept a reservation request for the use of the plurality of the parking spaces that are specified by locations associated with the parking spaces, through the server, for use by the valet service for a period of time; and an occupancy module configured to sense occupancy of the parking spaces that are reserved for the use of the valet service, through the vehicle occupancy sensor that corresponds to each of the parking spaces that are reserved for the use of the valet service, during the time period, and to provide the occupancy to the server via the network;

an availability module executed by the server and configured to indicate, through the parking availability indicators that correspond to each of the parking spaces that are reserved for use of the valet service, reserved use only of each of the parking spaces that are reserved for the use of the valet service; and an on-street valet module executed by the server and configured to assist a curbside valet through the server in use of one or more of the parking spaces that have been reserved for use of the valet service, comprising:

a location module executed by the server and configured to identify the location of at least one of the plurality of the parking spaces reserved for the valet service, wherein the at least one parking space is not occupied by a motor vehicle;

an identification module executed by the server and configured to provide the location of the at least one parking space that was identified as reserved and not occupied to the curbside valet to a device used by the curbside valet that is interfaced with the server via the computer network via the network; and an information receipt module executed by the server and configured to receive from the curbside valet a parking identification card of a user associated with a motor vehicle to occupy the at least one parking space and to initiate tracking of the motor vehicle.

2. A system according to claim 1, further comprising:
a check-in module executed by the server and configured to record, through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet, and to notify, through that smart parking device, the curbside valet to park the motor vehicle of the motorist near to a valet pickup location as the time of the likely return of the motorist approaches as provided to the corresponding smart parking device from the server via the network.

3. A system according to claim 1, further comprising:
a lockbox located near to the location of the at least one parking space that was identified as reserved and not occupied to the curbside valet; and
a check-in module executed by the server and configured to record, through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet, wherein a key for the motor vehicle is left in the lockbox by the curbside valet for retrieval by the motorist.

4. A system according to claim 1, further comprising at least one of:
a designation module executed by the server and configured to monitor through the server occupancy of the plurality of the parking spaces by a motorist's motor vehicle, which have been designated by the curbside valet as a valet drop-off location; and
a designation module executed by the server and configured to monitor through the server occupancy of the plurality of the parking spaces by a motorist's motor vehicle, which have been designated by the curbside valet as located nearby a valet drop-off location.

5. A system according to claim 1, further comprising:
the identification module executed by the server and configured to provide the location of the at least one parking space that was identified as reserved and not occupied to the curbside valet close to a destination identified by a motorist, as provided to a device used by the curbside valet that is interfaced with the server via the computer network;
a check-in module executed by the server and configured to record, through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet, and to notify, through that smart parking device, the curbside valet to park the motor vehicle of the motorist near to a valet pickup location as the time of the likely return of the motorist approaches as provided to the corresponding smart parking device from the server via the network;
a customer module executed by server and configured to provide the location of the at least one parking space that was identified as reserved and not occupied from a device used by the curbside valet to a device used by a motorist.

6. A method for providing distributed on-street valet parking with the aid of a digital computer, comprising:
providing a server configured to interface over a computer network and comprising a memory and a computer processor, the computer processor operatively coupled to the memory and configured to execute computer execute modules, wherein the server manages a multiplicity of motor vehicle parking spaces disbursed over a plurality of physically-separate and openly-disbursed parking locations;
interfacing, by the computer processor via the computer network, a plurality of smart parking devices that are each located proximate to and which correspond to at least one of the parking spaces;
interfacing, by the computer processor via the computer network, a plurality of vehicle occupancy sensors that are also each physically located proximate to and which correspond to at least one of the parking spaces;
interfacing, by the computer processor via the computer network, a plurality of parking availability indicators that are each associated with at least one of the parking spaces, each of the parking availability indicators comprising a plurality of indications that correspond to an availability of each of the associated parking spaces for parking based upon actual, reserved and restricted use of the parking space;
reserving, by the server, use of a plurality of the parking spaces for a valet service, comprising:
accepting, by the server, a reservation request for the use of the plurality of the parking spaces that are specified by locations associated with the parking spaces for use by the valet service for a period of time; and sensing occupancy of the parking spaces that are reserved for the use of the valet service by a motor vehicle, through the vehicle occupancy sensor that corresponds to each of the parking spaces that are reserved for the use of the valet service, during the time period, and providing the occupancy to the server via the network;

indicating reserved use only of each of the parking spaces that are reserved for the use of the valet service, by the parking availability indicator that corresponds to each of the parking spaces that are reserved for the use of the valet service;

assisting a curbside valet through the server in use of one or more of the parking spaces that have been reserved for use of the valet service, comprising:

identifying to a device used by the curbside valet that is interfaced with the server via the computer network the location of at least one of the plurality of the parking spaces reserved for the valet service, wherein the at least one parking space is not occupied by a motor vehicle;

providing the location of the at least one parking space that was identified as reserved and not occupied to the device used by the curbside valet; and receiving from the curbside valet a parking identification card of a user associated with a motor vehicle to occupy the at least one parking space to initiate tracking of the motor vehicle.

7. A method according to claim 6, further comprising:
recording through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet; and notifying through that smart parking device, the curbside valet to park the motor vehicle of the motorist near to a valet pickup location as the time of the likely return of the motorist approaches as provided to the corresponding smart parking device from the server via the network.

8. A method according to claim 6, further comprising:
recording through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet,
wherein a key for the motor vehicle is left in a lockbox located near to the location of the at least one parking space that was identified as reserved and not occupied to the curbside valet.

9. A method according to claim 6, further comprising at least one of:
monitoring through the server occupancy of the plurality of the parking spaces by a motorist's motor vehicle, which have been designated by the curbside valet as a valet drop-off location; and
monitoring through the server occupancy of the plurality of the parking spaces by a motorist's motor vehicle, which have been designated by the curbside valet as located nearby a valet drop-off location.

10. A method according to claim 6, further comprising:
providing the location of the at least one parking space that was identified as reserved and not occupied to the curbside valet close to a destination identified by a motorist to a device used by the curbside valet that is interfaced with the server via the computer network;

recording through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet;

notifying through that smart parking device, the curbside valet to park the motor vehicle of the motorist near to a valet pickup location as the time of the likely return of the motorist approaches as provided to the corresponding smart parking device from the server via the network; and providing the location of the at least one parking space that was identified as reserved and not occupied from a device used by the curbside valet to a device used by a motorist.

11. A system for providing distributed on-street valet parking with the aid of a digital computer, comprising:
a server configured to manage a multiplicity of motor vehicle parking spaces disbursed over a plurality of physically-separate and openly-disbursed parking locations, the server configured to interface over a computer network and comprising a memory and a computer processor, the computer processor operatively coupled to the memory and configured to execute computer executable program modules;

a plurality of smart parking devices that are each located proximate to and which correspond to at least one of the parking spaces, each of the smart parking devices interfaced with the server via the computer network;

a plurality of vehicle occupancy sensors that are also each located proximate to and which correspond to least one of the parking spaces, each of the vehicle occupancy sensors interfaced with the server via the computer network;

a plurality of parking availability indicators that are each associated with each one of the parking spaces, each of the parking availability indicators interfaced with the server via the computer network, each of the parking availability indicators comprising a plurality of indications that correspond to an availability of each of the associated parking spaces for parking based upon actual, reserved and restricted use of the parking space;

a reservations module executed by the server and configured to reserve through the server use of a plurality of the parking spaces for a valet service, comprising:
a request module configured to accept a reservation request for the use of the plurality of the parking spaces that are specified by locations associated with the parking spaces, through the server, for use by the valet service for a period of time; and
an occupancy module configured to sense occupancy of the parking spaces that are reserved for the use of the valet service by a motor vehicle, through the vehicle occupancy sensor that corresponds to each of the parking spaces that are reserved for the use of the valet service, during the time period, and to provide the occupancy to the server via the network;

an availability module executed by the server and configured to indicate, through the parking availability indicators that correspond to each of the parking spaces that are reserved for use of the valet service, reserved use only of each of the parking spaces that are reserved for the use of the valet service; and a tracking module executed by the server and configured to assist the valet service through the server in use of the parking spaces that have been reserved, comprising:
a location module executed by the server and configured to identify the location of at least one of the plurality of the parking spaces reserved for the valet service, wherein the at least one parking space is not occupied by a motor vehicle;
an identification module executed by the server and configured to provide the location of the at least one parking space that was identified as reserved and not occupied to the valet service;
an information receipt module executed by the server and configured to receive from a curbside valet a parking identification card of a user associated with a motor vehicle to occupy the at least one parking space to initiate tracking of the motor vehicle; and
an occupancy module executed by the server and configured to track occupancy of the at least one parking space by the motorist's motor vehicle based on the parking identification card and a time when the motorist is likely to return for a motor vehicle left with the curbside valet.

12. A system according to claim 11, further comprising:
a check-out module executed by the server and configured to notify, through one of the smart parking devices, the valet service of the location of the at least one parking space upon receipt of the identification information for the motorist through that smart parking device and to instruct the valet service to park the motor vehicle of the motorist near to a valet pickup location as the time of the likely return of the motorist approaches as provided to the that smart parking device from the server via the network.

13. A system according to claim 11, further comprising:
a check-in module executed by the server and configured to record, through the smart parking device that corresponds to the location of at least one parking space that has been designated as a drop-off location for the valet service, occupancy of at least one parking space by a motorist's motor vehicle at a location other than that of the at least one parking space and a time when the motorist is likely to return for a motor vehicle left with the valet service.

14. A system according to claim 11, further comprising at least one of:
a designation module executed by the server and configured to monitor through the server occupancy of the plurality of the parking spaces by a motorist's motor vehicle, which have been designated by the valet service as a valet drop-off location; and
a designation module executed by the server and configured to monitor through the server occupancy of the plurality of the parking spaces by a motorist's motor vehicle, which have been designated by the valet service as located nearby a valet drop-off location.

15. A system according to claim 11, further comprising:
the identification module executed by the server and configured to provide the location of the at least one parking space that was identified as reserved and not occupied to the curbside valet close to a destination identified by a motorist, as provided to a device used by the curbside valet that is interfaced with the server via the computer network;

a check-in module executed by the server and configured to record, through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet, and to notify, through that smart parking device, the curbside valet to park the motor vehicle of the motorist near to a valet pickup location as the time of the likely return of the motorist approaches as provided to the corresponding smart parking device from the server via the network;
a customer module executed by server and configured to provide the location of the at least one parking space that was identified as reserved and not occupied from a device used by the curbside valet to a device used by a motorist.

16. A method for providing distributed on-street valet parking with the aid of a digital computer, comprising:
providing a server configured to interface over a computer network and comprising a memory and a computer processor, the computer processor operatively coupled to the memory and configured to execute computer execute modules, wherein the server manages a multiplicity of motor vehicle parking spaces disbursed over a plurality of physically-separate and openly-disbursed parking locations;
interfacing, by the computer processor via the computer network, a plurality of smart parking devices that are each located proximate to and which correspond to at least one of the parking spaces;
interfacing, by the computer processor via the computer network, a plurality of vehicle occupancy sensors that are also each physically located proximate to and which correspond to at least one of the parking spaces;
interfacing, by the computer processor via the computer network, a plurality of parking availability indicators that are each associated with at least one of the parking spaces, each of the parking availability indicators comprising a plurality of indications that correspond to an availability of each of the associated parking spaces for parking based upon actual, reserved and restricted use of the parking space;
reserving, by the server, use of a plurality of the parking spaces for a valet service, comprising:
accepting, by the server, a reservation request for the use of the plurality of the parking spaces that are specified by locations associated with the parking spaces for use by the valet service for a period of time; and
sensing occupancy of the parking spaces that are reserved for the use of the valet service by a motor vehicle, through the vehicle occupancy sensor that corresponds to each of the parking spaces that are reserved for the use of the valet service, during the time period, and providing the occupancy to the server via the network;
indicating reserved use only of each of the parking spaces that are reserved for the use of the valet service, by the parking availability indicator that corresponds to each of the parking spaces that are reserved for the use of the valet service;
assisting the valet service through the server in use of the parking spaces that have been reserved, comprising;

identifying the location of at least one of the plurality of the parking spaces reserved for the valet service, wherein the at least one parking space is not occupied by a motor vehicle;

providing the location of the at least one parking space that was identified as reserved and not occupied to the valet service to a device used by the valet service that is interfaced with the server via the computer network;

receiving from a curbside valet a parking identification card of a user associated with a motor vehicle to occupy the at least one parking space; and tracking occupancy of the at least one parking space by the motorist's motor vehicle based on the parking identification card and a time when the motorist is likely to return for a motor vehicle left with the curbside valet.

17. A method according to claim 16, further comprising:

notifying through one of the smart parking devices, the valet service of the location of the at least one parking space upon receipt of the identification information for the motorist through that smart parking device; and instructing the valet service to park the motor vehicle of the motorist near to a valet pickup location as the time of the likely return of the motorist approaches as provided to the that smart parking device from the server via the network.

18. A method according to claim 16, further comprising:

recording through the smart parking device that corresponds to the location of at least one parking space that has been designated as a drop-off location for the valet service, occupancy of at least one parking space by a motorist's motor vehicle at a location other than that of the at least one parking space and a time when the motorist is likely to return for a motor vehicle left with the valet service.

19. A method according to claim 16, further comprising at least one of:

monitoring through the server occupancy of the plurality of the parking spaces by a motorist's motor vehicle, which have been designated by the valet service as a valet drop-off location; and monitoring through the server occupancy of the plurality of the parking spaces by a motorist's motor vehicle, which have been designated by the valet service as located nearby a valet drop-off location.

20. A method according to claim 16, further comprising:

providing the location of the at least one parking space that was identified as reserved and not occupied to the curbside valet close to a destination identified by a motorist to a device used by the curbside valet that is interfaced with the server via the computer network;

recording through the smart parking device that corresponds to the location of the at least one parking space that was identified as reserved and not occupied to the curbside valet, occupancy of the at least one parking space by a motorist's motor vehicle and a time when the motorist is likely to return for a motor vehicle left with the curbside valet;

notifying through that smart parking device, the curbside valet to park the motor vehicle of the motorist near to a valet pickup location as the time of the likely return of the motorist approaches as provided to the corresponding smart parking device from the server via the network; and providing the location of the at least one parking space that was identified as reserved and not occupied from a device used by the curbside valet to a device used by a motorist.

* * * * *